(12) United States Patent
Baek et al.

(10) Patent No.: US 12,342,361 B2
(45) Date of Patent: Jun. 24, 2025

(54) METHOD AND DEVICE FOR SUPPORTING URLLC SERVICE

(71) Applicant: Samsung Electronics Co., Ltd., Gyeonggi-do (KR)

(72) Inventors: Sangkyu Baek, Gyeonggi-do (KR); Anil Agiwal, Gyeonggi-do (KR); Soenghun Kim, Gyeonggi-do (KR); Jaehyuk Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 400 days.

(21) Appl. No.: 18/015,568

(22) PCT Filed: Aug. 5, 2021

(86) PCT No.: PCT/KR2021/010354
§ 371 (c)(1),
(2) Date: Jan. 11, 2023

(87) PCT Pub. No.: WO2022/031082
PCT Pub. Date: Feb. 10, 2022

(65) Prior Publication Data
US 2023/0254880 A1    Aug. 10, 2023

(30) Foreign Application Priority Data
Aug. 5, 2020 (KR) .................. 10-2020-0098236

(51) Int. Cl.
*H04W 72/512* (2023.01)
*H04W 56/00* (2009.01)
(Continued)

(52) U.S. Cl.
CPC ..... *H04W 72/512* (2023.01); *H04W 56/0055* (2013.01); *H04W 72/21* (2023.01); *H04W 74/0808* (2013.01)

(58) Field of Classification Search
None
See application file for complete search history.

(56) References Cited

U.S. PATENT DOCUMENTS 10,455,603 B2   10/2019   Hosseini et al.
11,405,817 B2   8/2022   Baek et al.
(Continued)

FOREIGN PATENT DOCUMENTS

| KR | 10-2019-0090380 | 8/2019 |
|---|---|---|
| KR | 10-2020-0017780 | 2/2020 |
| WO | WO 2021/140351 | 7/2021 |

OTHER PUBLICATIONS

OPPO, Summary of Email Discussion [105#50][NR-U] RACH 4-step and SR, R2-1903282, 3GPP TSG-RAN WG2 Meeting #105bis, Apr. 6-12, 2019, 39 pages.
(Continued)

*Primary Examiner* — Anh Vu H Ly
(74) *Attorney, Agent, or Firm* — The Farrell Law Firm, P.C.

(57) ABSTRACT

The present disclosure provides a method, performed by a user equipment (UE), of determining a propagation delay value, the method including requesting a propagation delay from a base station, transmitting a time measurement signal on a time measurement resource allocated by the base station, receiving, from the base station, a response including an extended timing advance (TA) command, and based on the received response, applying time information and starting a timer. The present disclosure provides a method, performed by a UE, of performing communication in an unlicensed spectrum, the method including determining whether to transmit data via a configured grant (CG), comparing priorities of the CG and an uplink resource, and changing the priority of the CG, based on a listen before talk (LBT) failure.

12 Claims, 19 Drawing Sheets

(51) Int. Cl.
*H04W 72/21* (2023.01)
*H04W 74/0808* (2024.01)

(56) References Cited

U.S. PATENT DOCUMENTS

| | | |
|---|---|---|
| 2011/0170535 A1 | 7/2011 | Wang et al. |
| 2014/0079032 A1 | 3/2014 | Bergström et al. |
| 2020/0221410 A1 | 7/2020 | Kim et al. |
| 2021/0144751 A1* | 5/2021 | Joseph ................ H04W 72/115 |
| 2021/0307027 A1* | 9/2021 | Kung .................. H04W 72/569 |
| 2022/0109486 A1* | 4/2022 | Fu ........................ H04L 5/0044 |
| 2023/0337225 A1* | 10/2023 | Alfarhan ............. H04W 72/232 |

OTHER PUBLICATIONS

Ericsson, "Running MAC CR for NR-U", R2-2001341, 3GPP TSG-RAN2 #109e, Feb. 24-Mar. 6, 2020, 89 pages.
European Search Report dated Feb. 7, 2024 issued in counterpart application No. 21853473.3-1206, 10 pages.
PCT/ISA/210, International Search Report dated Nov. 5, 2021 issued in counterpart application No. PCT/KR2021/010354, 6 pages.
PCT/ISA/237, Written Opinion dated Nov. 5, 2021 issued in counterpart application No. PCT/KR2021/010354, 4 pages.
Mahmood, Aamir et al., "Over-the-Air Time Synchronization for URLLC:Requirements, Challenges and Possible Enablers", arXiv:1807.00078v1 [eess.SP] Jun. 29, 2018, pp. 6.

* cited by examiner

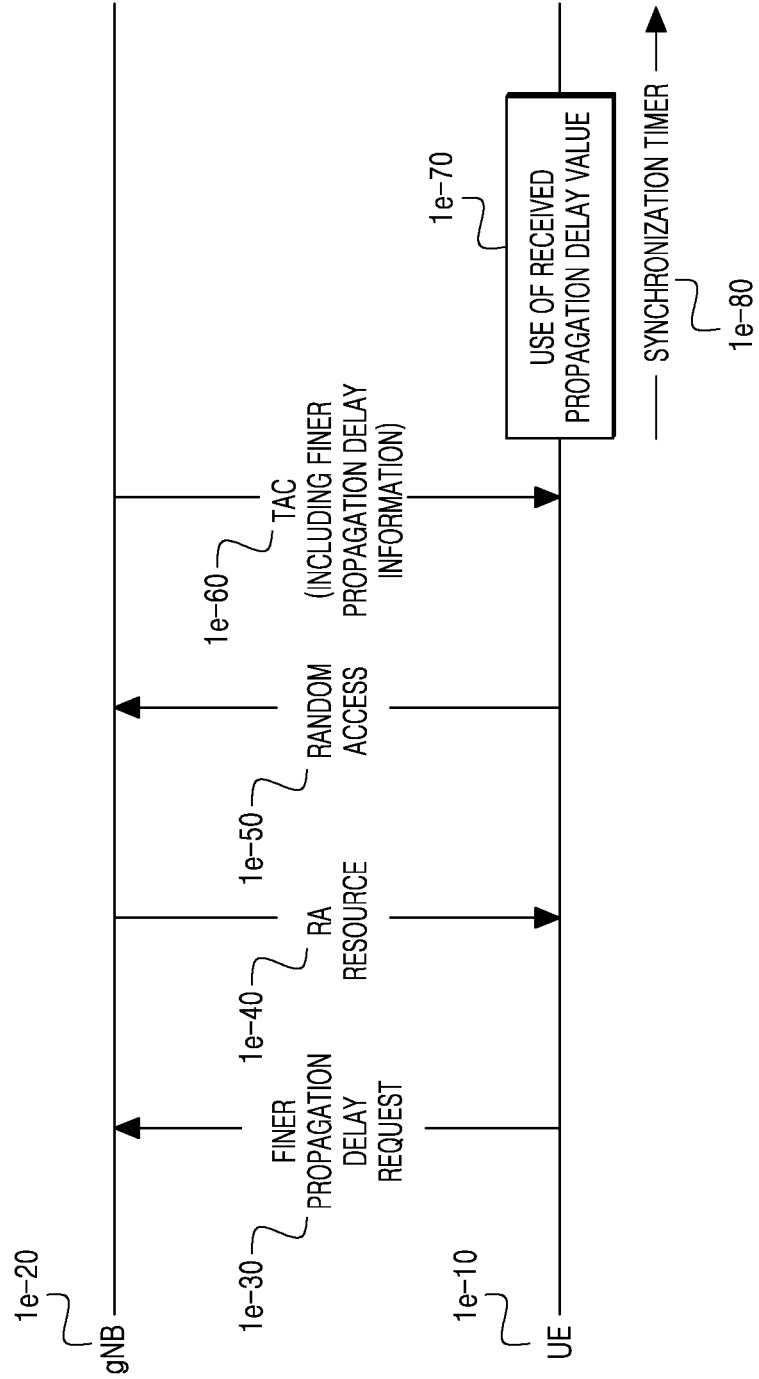

FIG. 1G

| | | |
|---|---|---|
| R | EXTENDED TIMING ADVANCE COMMAND | Oct 1 |
| EXTENDED TIMING ADVANCE COMMAND | | Oct 2 |
| EXTENDED TIMING ADVANCE COMMAND | | Oct 3 |
| UNCERTAINTY | UL GRANT | Oct 4 |
| UL GRANT | | Oct 5 |
| UL GRANT | | Oct 6 |
| UL GRANT | | Oct 7 |
| TEMPORARY C-RNTI | | Oct 8 |
| TEMPORARY C-RNTI | | Oct 9 |

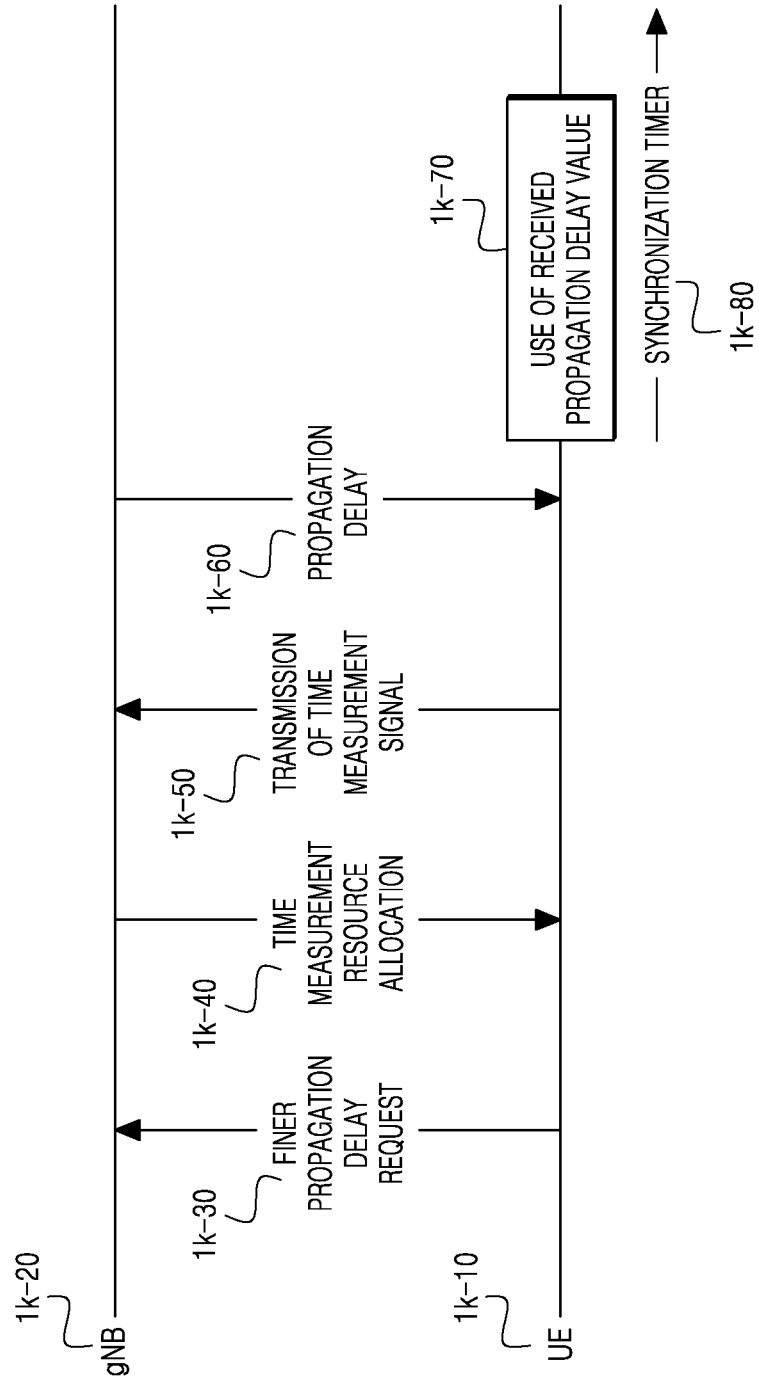

METHOD AND DEVICE FOR SUPPORTING URLLC SERVICE

PRIORITY

This application is a National Phase Entry of PCT International Application No. PCT/KR2021/010354, which was filed on Aug. 5, 2021, and claims priority to Korean Patent Application No. 10-2020-0098236, which was filed on Aug. 5, 2020, the entire content of which is incorporated herein by reference.

TECHNICAL FIELD

The present disclosure relates to a method and device for supporting an ultra-reliable and low latency (URLLC) service.

BACKGROUND ART

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60-GHz band) is under consideration to achieve high data transfer rates. To mitigate path loss of radio waves and increase transmission distance of radio waves in an ultra-high frequency band for 5G communication systems, technologies such as beamforming, massive multiple-input multiple-output (MIMO), full dimensional MIMO (FD-MIMO), array antennas, analog beamforming, and large-scale antennas are being studied. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and received-interference cancellation are currently being developed. In addition, for 5G systems, advanced coding modulation (ACM) schemes, such as Hybrid FSK and QAM Modulation (FQAM) and Sliding Window Superposition Coding (SWSC), and advanced access techniques, such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, healthcare, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies.

As various services may be provided with the advancements in mobile communication systems as described above, in particular, a method of more accurately measuring and applying a delay between a user equipment (UE) and a base station is required.

DISCLOSURE

Technical Solution

The present disclosure relates to a method and device for supporting an ultra-reliable low latency (URLLC) service.

DESCRIPTION OF DRAWINGS

FIG. 1E is a diagram illustrating a method of applying finer time information, according to an embodiment of the present disclosure.

FIG. 1G is a diagram illustrating a format of a random access response message according to an embodiment of the present disclosure.

FIG. 1K is a diagram illustrating a method of applying finer time information, according to an embodiment of the present disclosure.

BEST MODE

According to an embodiment of the present disclosure, a method, performed by a user equipment (UE), of determining a propagation delay value may include requesting a propagation delay to from a base station, transmitting a time measurement signal on a time measurement resource allocated by the base station, receiving, from the base station, a response including an extended timing advance (TA) command, and based on the received response, applying time information and starting a timer.

According to another embodiment of the present disclosure, a method, performed by a UE, of performing communication in an unlicensed spectrum may include determining whether to transmit data via a configured grant (CG), comparing priorities of the CG and an uplink resource, and changing the priority of the CG based on a listen before talk (LBT) failure.

MODE FOR INVENTION

In the following description of the present disclosure, when it is determined that detailed descriptions of related known functions or configurations may unnecessarily obscure the subject matter of the present disclosure, the descriptions thereof will be omitted. Hereinafter, embodiments of the present disclosure will be described in detail with reference to the accompanying drawings.

Figure 1A:
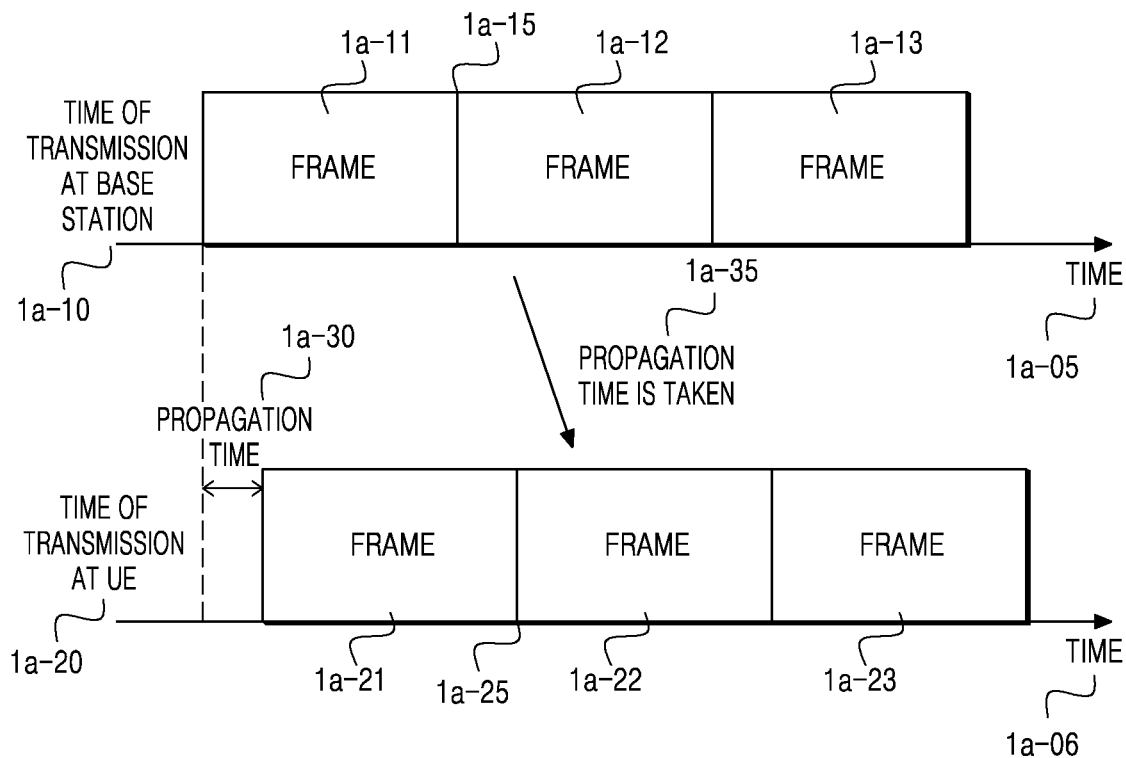
FIG. 1A is a diagram for describing a case in which a difference between a time of transmission by a base station and a time of reception by a user equipment (UE) occurs in each cell.

FIG. 1A is a diagram for describing a case in which a difference between a time of transmission by a base station and a time of reception by a user equipment (UE) occurs in each cell.

Referring to FIG. 1A, when a radio wave is transmitted from a transmitting device to a receiving device, a propagation time is taken in proportion to a distance by which the radio wave is transmitted (1a-35). In this case, a speed of the radio wave may be assumed to be the speed of light. Accordingly, as the propagation time is required between the transmitting device and the receiving device, a time difference exists between the transmitting device and the receiving device with respect to the same reference time point. Due to the presence of such a propagation time 1a-30, a time difference, e.g., a propagation time 1a-30, between a time 1a-10 when a base station transmits in downlink (DL) and a time 1a-20 when a UE receives in the DL may occur. Therefore, there exists a difference between frames 1a-11, 1a-12, and 1a-13 transmitted by the base station based on the time of transmission and frames 1a-21, 1a-22, and 1a-23 received by the UE based on the time of reception. The propagation time 1a-30 is also referred to as a propagation delay.

When the base station transmits time information of a reference time point to the UE, it is necessary to set whether to use the time of transmission by the base station as a reference or use the time of reception by the UE is used as a reference. Furthermore, it is required to compensate for an error between the two times, i.e., a propagation delay, so that the time information may be accurately processed according to the set reference. For example, in order to use the time of transmission by the base station as a reference, the base station may inform the UE of how much the time of reception by the UE differs from the time of transmission, i.e., information about the propagation time 1a-30 actually required for transmission from the base station to the UE. The information about the propagation time 1a-30 may be included in a time information message transmitted by the base station to the UE or may be transmitted as a separate message. In an embodiment of the present disclosure, half of a timing advance (TA) value used when the UE advances transmission timing of a message by a certain amount of time with respect to a reception time may be used as the difference between the time of transmission by the base station and the time of reception by the UE. In another embodiment of the present disclosure, in order to use the time of reception by the UE as a reference, the base station may include in time information a value obtained by adding the propagation time 1a-30 to the actual time of transmission by taking into account a propagation time required for transmission to the UE in advance and transmit the time information. Also, whether to use the time of transmission by the base station as a reference time or the time of reception by the UE as a reference time may be transmitted in a time information message. Regardless of using the time of transmission by the base station as a reference time or using the time of reception by the UE as a reference time, the UE may update the time information, based on an end point of a slot, a start point of the slot, or a frame indicated by the base station. This time information may apply an end point of a slot, a start time of the slot, or a frame indicated by the base station based on a specific cell promised by the base station and the UE. The specific cell may be a primary cell (PCell). In another embodiment of the present disclosure, this specific cell may be a primary secondary cell (PSCell) or a cell configured by the base station.

Figure 1B:
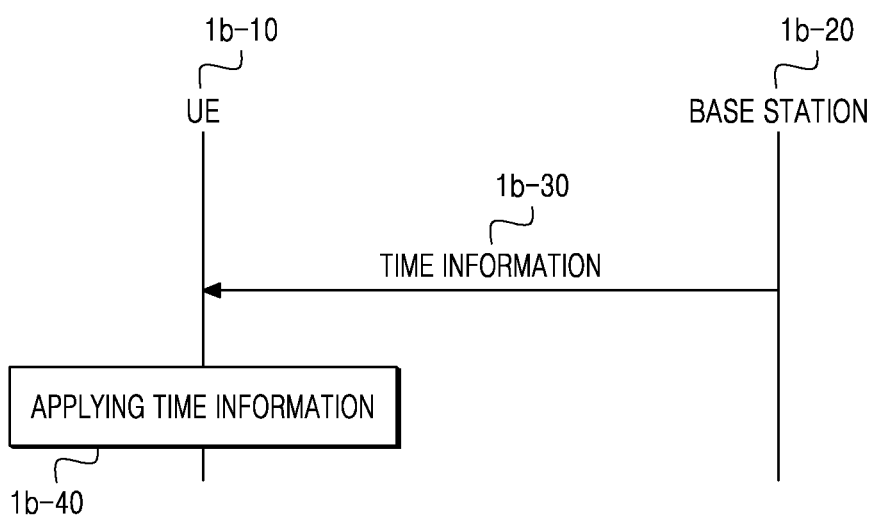
FIG. 1B is a diagram illustrating a procedure in which a base station transmits accurate time information to a UE, according to an embodiment of the present disclosure.

FIG. 1B is a diagram illustrating a procedure in which a base station transmits accurate time information to a UE, according to an embodiment of the present disclosure.

Referring to FIG. 1B, in order to operate by connecting to ultra-reliable and low latency communication (URLLC) services or a time-sensitive networking (TSN) network, a UE 1b-10 needs to obtain accurate time information working in a communication system. The time information requires an accuracy of the order of several nanoseconds (ns) to several hundreds of ns. If such accuracy is not guaranteed, quality of service (QoS) requirements required by the URLLC services or TSN may not be satisfied. That is, a base station and a UE need to be time synchronized with each other at a finer degree of accuracy.

Accordingly, the UE 1b-10 may receive accurate time information 1b-30 from a base station 1b-20. In an embodiment of the present disclosure, time information may include a time that is used in a communication network that the UE accesses and uses. In addition, the time information may include a time that coincides with a time provided by a specific satellite or differs therefrom within a range of allowable error. When the time information includes the time that is used in the communication network, a reference time point may be needed to indicate a time at which the time in the time information is. For example, the reference time point may be an ending boundary of a specific cell indicated by a system frame number (SFN), a slot number, or a symbol number. In other words, the time information may include information about the reference time point to be indicated by the time information and a time at the reference time point. Here, a specific cell may be a PCell. In addition, Uncertainty indicating the degree of accuracy of time information may be transmitted in the time information.

In an embodiment of the present disclosure, upon receiving time information, the UE 1b-10 may apply the time information to accurately know the time of a communication system to the UE 1b-10 is connected (1b-40). In this case, the UE 1b-10 may apply a reference time point at the time when the base station 1b-20 transmits the time information, or a reference time point at the time when the UE receives the corresponding message. If the time transmitted by the base station to the UE is the time that is used by a communication network, i.e., the time that is used by the base station, the UE has to apply the received time information 1b-30 by compensating for the propagation time 1a-30 between the base station and the UE. This propagation time may be half of a TA value transmitted by the base station, or may be a propagation time value transmitted by the base station directly to the UE.

In another embodiment of the present disclosure, the UE 1b-10 may receive time information from the base station 1b-20 through a time information message. However, the present disclosure is not limited thereto, and the UE 1b-10 may receive the time information from the base station 1b-20 in various ways, such as in other forms than messages.

Figure 1C:
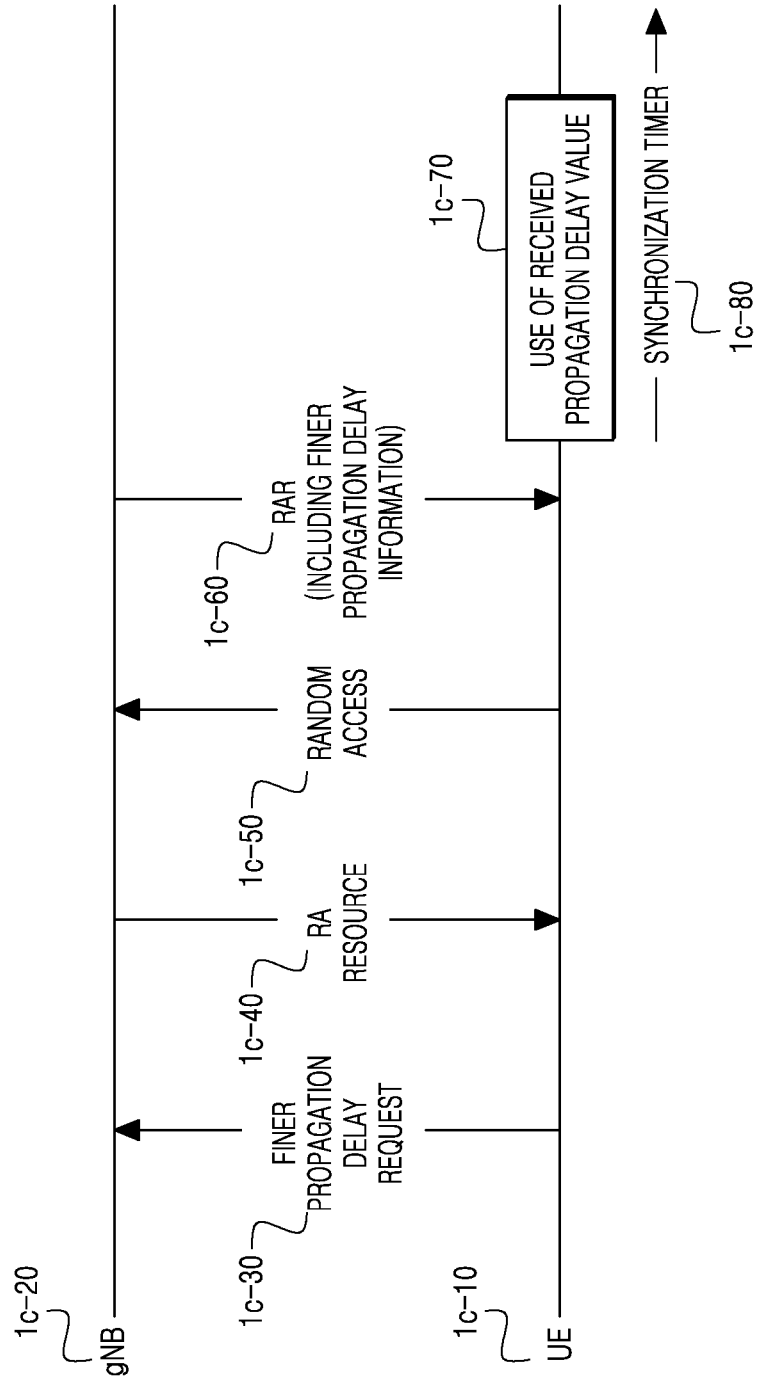
FIG. 1C is a diagram illustrating a method of applying finer time information, according to an embodiment of the present disclosure.

FIG. 1C is a diagram illustrating a method of applying finer time information, according to an embodiment of the present disclosure.

Referring to FIG. 1C, in order to operate by connecting to URLLC services or a TSN network, a UE 1c-10 needs to obtain accurate time information working in a communication system. The time information requires an accuracy of the order of several ns to several hundreds of ns. If such accuracy is not guaranteed, the QoS requirements of the URLLC services or TSN may not be satisfied. To this end, as shown in FIG. 1B, the base station may transmit the finer time information 1b-30 to the UE. However, if a propagation delay between the base station and the UE is not properly compensated for, the time information transmitted from the base station to the UE has an error. Therefore, the UE needs to apply a propagation time with a finer degree of accuracy by using finer propagation delay information.

In some cases, it may be difficult for the base station to know which UE requires finer propagation delay information. Accordingly, the UE 1c-10 may transmit, to a base station 1c-20, whether it requires finer propagation delay information. That is, the UE may request a finer propagation delay value from the base station (1c-30). The message requesting the finer propagation delay value may include information indicating that the corresponding UE requires a finer propagation delay and an accuracy value for the finer propagation delay required by the UE. The message may also include an accuracy value for a propagation delay desired by the UE. In some cases, this accuracy value may be replaced with a value such as Uncertainty.

Thereafter, the base station may measure a propagation delay between the UE and the base station. Measurement of the propagation delay may be performed using a random access (RA) procedure. The base station may allocate a RA resource for propagation delay measurement to the UE (1c-40). In the related art, a base station may allocate a RA resource to a UE, and the RA resource is allocated for the purpose of applying a TA value indicating the time at which the UE starts uplink (UL) transmission to the base station. However, an embodiment of the present disclosure is for the purpose of, when applying time information transmitted by the base station to the UE, applying the time information by compensating for a propagation delay, which may not be directly related to determining the time when UL transmission starts by applying a TA value. In addition, the time information 1b-30 transmitted by the base station to the UE may be required to have a finer degree of accuracy than a TA value. Accordingly, RA performed on the RA source for propagation delay measurement, i.e., a RA preamble 1c-50 transmitted for propagation delay measurement may have a different accuracy from that of an existing RA resource. For this purpose, a RA resource with a high degree of accuracy for propagation delay measurement may be distinguished from the existing RA resource. This may be identified by a RA preamble index in some cases, and a RA preamble resource for a specific index value may be classified and used as a RA resource with a finer degree of accuracy. In some cases, an index value greater than (or greater than or equal to) the specific index value may be classified and used as a RA resource with a finer degree of accuracy. For the purpose of measuring a propagation delay or in a case that RA with a finer degree of accuracy is required, the RA preamble 1c-50 may be transmitted using the RA resource classified as described above. The base station 1c-20 that has received the RA preamble on the classified RA resource may transmit, in a RA response (RAR) message, a finer propagation delay value to the UE (1c-60). According to another embodiment of the present disclosure, a TA value may be included in the RAR message instead of propagation delay information, and in this case, the UE may use a half of the TA value as a propagation delay. According to another embodiment of the present disclosure, TA command value information for the TA value may be included in the RAR message. In this case, the UE may derive the TA value through a TA command value.

According to an embodiment of the present disclosure, an accuracy or uncertainty value for a TA command value or a propagation delay may be transmitted in the RAR message. The accuracy or uncertainty value may include a time unit or the exact number of digits indicating how accurate the transmitted TA value, TA command value, or propagation delay is. Thereafter, the UE may apply the time information 1b-30 transmitted by the base station by using the received propagation delay value (1c-70). This propagation delay value may be used to correct the time information transmitted by the base station.

Because a propagation delay measured once may vary for the UE having mobility, the UE may have to receive a propagation delay or a TA value again from the base station. To achieve this, the UE may transmit a message requesting a finer propagation delay to the base station (1c-30) or retransmit the RA preamble 1c-50 for propagation delay measurement. In order to adjust the above frequency, the UE may have a synchronization timer 1c-80. The UE may start or restart the synchronization timer 1c-80 when receiving the finer propagation delay information or TA value, and when the synchronization timer 1c-80 expires, the UE may transmit a message requesting a finer propagation delay to the base station (1c-30), or retransmit the RA preamble 1c-50 for propagation delay measurement. The synchronization timer 1c-80 may have a duration shorter than or equal to a TA timer. When receiving a finer TA value or propagation delay value, the UE may also start or restart the TA timer.

Figure 1D:
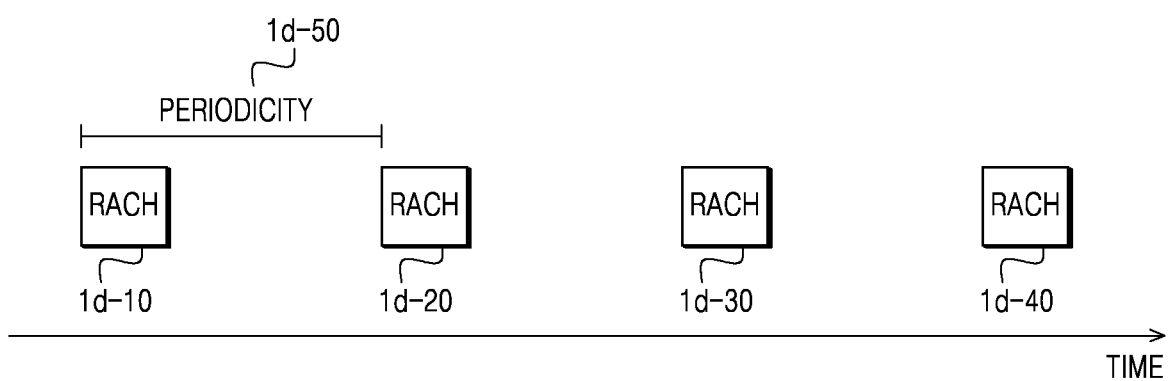
FIG. 1D is a diagram illustrating a method of allocating periodic random access preamble resources, according to an embodiment of the present disclosure.

FIG. 1D is a diagram illustrating a method of allocating periodic RA preamble resources, according to an embodiment of the present disclosure.

If a UE moves with mobility, a propagation delay needs to be periodically measured. For this purpose, it may be an inefficient configuration to force the UE initiate RA or contention-based RA through a physical DL control channel (PDCCH) order for each time. For this purpose, RA channel (RACH) resources 1d-10, 1d-20, 1d-30, and 1d-40 may be allocated periodically. The base station may configure a periodicity 1d-50 during which RACH resources are repeated, and a location of a RA preamble or an index of the RA preamble. By transmitting a RA preamble for every specific time period based on this configuration, the UE may receive a finer propagation delay, TA command value, or TA value.

In another embodiment of the present disclosure, the base station may not necessarily configure a RA resource for periodic measurement of a propagation delay. That is, other physical resources such as a sounding reference signal (SRS), a demodulation reference signal (DMRS), a physical UL shared channel (PUSCH), a physical UL control channel (PUCCH), etc. may be used. Even in this case, as shown in FIG. 1D, resources for time measurement may be periodically allocated with the periodicity 1d-50 to measure the propagation delay. The UE may transmit an UL signal on the resources, and the base station may measure the propagation delay and transmit the measured propagation delay to the UE.

FIG. 1E is a diagram illustrating a method of applying finer time information, according to an embodiment of the present disclosure.

To operate by connecting to URLLC services or a TSN network, a UE 1e-10 needs to obtain accurate time information working in a communication system. The time information requires accuracy on the order of several ns to several hundreds of ns. If such accuracy is not guaranteed, the QoS requirements of the URLLC services or TSN may not be satisfied. To this end, as shown in FIG. 1B, the base station may transmit the finer time information 1b-30 to the UE. However, if a propagation delay between the base station and the UE is not properly compensated for, the time information transmitted from the base station to the UE has an error. Therefore, the UE needs to apply a propagation time with a finer degree of accuracy by using propagation delay information having a finer degree of accuracy.

In some cases, it may be difficult for the base station to know which UE requires finer propagation delay information. Accordingly, the UE 1e-10 may transmit, to a base station 1e-20, whether it requires finer propagation delay information. In other words, the UE may request a finer propagation delay value to be received from the base station (1e-30). The message requesting the finer propagation delay value may include information indicating that the corresponding UE requires a finer propagation delay, as well as an accuracy value for the finer propagation delay required by the UE. The message may also include an accuracy value for a propagation delay desired by the UE. In some cases, this accuracy value may be replaced with a value such as Uncertainty.

To this end, the base station may need to measure a propagation delay between the UE and the base station. Measurement of the propagation delay may be performed using a RA procedure. The base station may allocate a RA resource for propagation delay measurement to the UE (1e-40). In the related art, a base station may allocate a RA resource to a UE, and the RA resource is allocated for the purpose of applying a TA value indicating the time at which the UE starts UL transmission to the base station. However, according to an embodiment of the present disclosure, a RA resource is for the purpose of, when applying time information transmitted by the base station to the UE, applying the time information by compensating for a propagation delay, which may not be directly related to determining the time when UL transmission starts by applying a TA value. In addition, the time information 1b-30 transmitted by the base station to the UE may be required to have a finer degree of accuracy than a TA value. Accordingly, RA performed on the RA source for propagation delay measurement, i.e., a RA preamble 1e-50 transmitted for propagation delay measurement may have a different accuracy from that of an existing RA resource. For this purpose, a RA resource with a high degree of accuracy for propagation delay measurement may be distinguished from the existing RA resource. This may be identified by a RA preamble index according to an embodiment, and a RA preamble resource for a specific index value may be classified and used as a RA resource with finer degree of accuracy. In some embodiments, an index value greater than (or greater than or equal to) the specific index value may be classified and used as a RA resource with a finer degree of accuracy. Thus, for the purpose of measuring a propagation delay or in a case that RA with a finer degree of accuracy is required, the RA preamble 1c-50 may be transmitted using the RA resource classified as described above. The base station 1e-20 that has received the RA preamble on the classified RA resource may transmit, in a TA command message, a finer propagation delay value to the UE (1e-60). However, a TA value may be included in the RAR message instead of the propagation delay information, and in this case, the UE may use a half of the TA value as a propagation delay. According to another embodiment of the present disclosure, TA command information for the TA value may be included. In this case, the UE may derive the TA value through a TA command.

According to an embodiment of the present disclosure, an accuracy or uncertainty value for a TA command value or a propagation delay may be transmitted in the TA command message. The accuracy or uncertainty value may include a time unit or the exact number of digits indicating how accurate the transmitted TA value, TA command value, or propagation delay is. Thereafter, the UE may apply the time information 1b-30 transmitted by the base station by using the received propagation delay value (1e-70). This propagation delay value may be used to correct the time information transmitted by the base station.

Because a propagation delay measured once may vary for the UE having mobility, the UE may have to receive a propagation delay or a TA value again from the base station. To achieve this, the UE may transmit a message requesting a finer propagation delay to the base station (1e-30) or retransmit the RA preamble for propagation delay measurement (1e-50). In order to adjust the frequency of transmission or retransmission, the UE may have a synchronization timer 1e-80. The UE may start or restart the synchronization timer 1e-80 when receiving the finer propagation delay information or TA value, and when the synchronization timer 1c-80 expires, the UE may transmit a message requesting a finer propagation delay to the base station (1e-30), or retransmit the RA preamble for propagation delay measurement (1e-50). The synchronization timer 1c-80 may have a duration shorter than or equal to a TA timer. When receiving a finer TA value or propagation delay value, the UE may also start or restart the TA timer.

Figure 1F:
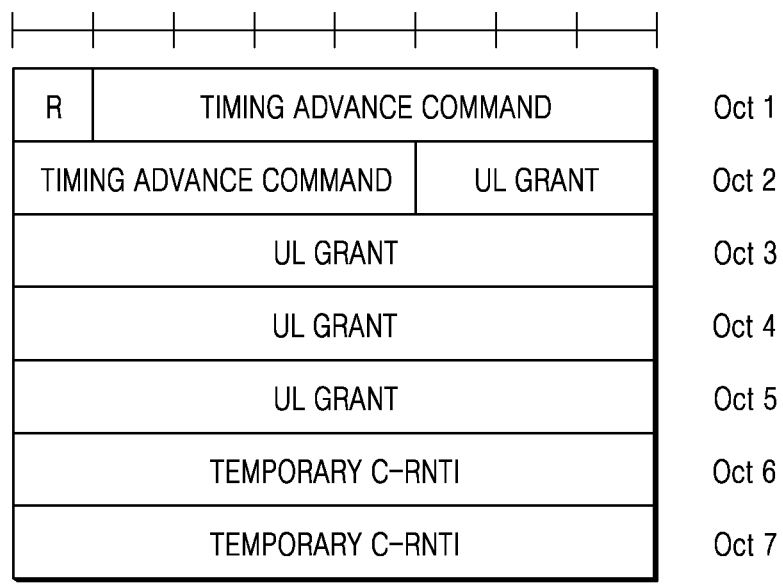
FIG. 1F is a diagram illustrating a format of a random access response message.

FIG. 1F is a diagram illustrating a format of a RAR message.

In the related art, when a UE transmits a RA preamble, a base station may transmit a RAR message in response thereto. The RAR message may include a TA command to allow the UE to adjust a TA value indicating the time at which the UE starts transmission to the base station. In FIG. 1F, it is assumed that the TA command is a 12-bit value representing a TA command value. However, if a finer TA value is required, the length of the TA command value may need to be changed. The base station may transmit, in the RAR message, UL grant allocation information so that the UE that has transmitted the RA preamble may transmit Message 3 in the subsequent RA operation. Based on this, the UE may transmit Message 3. A temporary cell radio network temporary identity (C-RNTI) value may also be included in the RAR message in order for the UE to receive Message 4 thereafter. However, because such UL grant allocation information or temporary C-RNTI is a configuration mainly required for a UE performing an initial access, these values may not be needed for the UE requiring a finer TA value or a finer propagation delay value.

FIG. 1G is a diagram illustrating a format of a RAR message according to an embodiment of the present disclosure.

In the related art, when a UE transmits a RA preamble, a base station may transmit a RAR message in response thereto. The RAR message may include a TA command to allow the UE to adjust a TA value indicating the time at which the UE starts transmission to the base station. However, if a finer TA value is required, the length of the TA command value may need to be changed. In this regard, a finer TA command value may have a length greater than 12 bits of a conventional TA command. This is referred to as an extended TA command in FIG. 1G. Although FIG. 1G shows the extended TA command having a length of 23 bits, the length only indicates that it is greater than 12 bits of the conventional TA command, and an exact length thereof may vary depending on the case. When the base station is not able to support the accuracy of a TA command supported via a length of an extended TA command field, a field separately indicating the accuracy of the TA command actually supported by the base station is required. This is referred to as an uncertainty field in FIG. 1G. For example, if the extended TA command is expressed in units (multiples) of 10 ns, but the accuracy of a propagation delay supported by the base station is 40 ns, the uncertainty field may be set to a value corresponding to 40 ns. The value of this uncertainty field may be set to a multiple of a unit of the uncertainty value.

The base station may transmit, in the RAR message, UL grant allocation information so that the UE that has transmitted the RA preamble may transmit Message 3 in the subsequent RA operation. Based on this, the UE may transmit Message 3. A temporary C-RNTI value may also be included in the RAR message in order for the UE to receive Message 4 thereafter. However, because such UL grant allocation information or temporary C-RNTI is a configuration mainly required for a UE performing an initial access, these values may not be needed for the UE requiring a finer TA value or a finer propagation delay value. Thus, in some cases, the RAR message transmitted to the UE requiring the finer TA value or propagation delay value may not include UL grant allocation information or temporary C-RNTI. The RAR message including the extended TA command field of FIG. 1G may be used in the same sense as the RAR message in which the finer TA value or propagation delay value is transmitted.

Figure 1H:
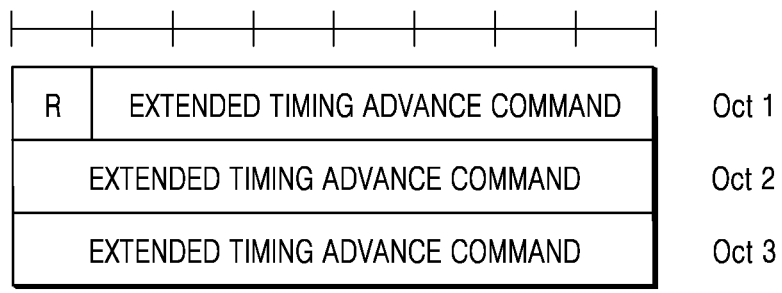
FIG. 1H is a diagram illustrating a format of an extended timing advance (TA) command message according to an embodiment of the present disclosure.

FIG. 1H is a diagram illustrating a format of an extended TA command message according to an embodiment of the present disclosure.

In the related art, when a UE transmits a RA preamble, a base station may transmit a TA command message in response thereto to allow the UE to adjust a TA value indicating the time at which the UE starts transmission to the base station. Such a TA command may be transmitted in the form of a medium access control (MAC) control element (CE). However, if a finer TA value is required, a length of a TA command value in the TA command message may need to be changed. Furthermore, a finer TA command value may have a length greater than 12 bits of a conventional TA command. In an embodiment of the present disclosure, in FIG. 1H, a finer TA command value having a great length is referred to as an extended TA command. Although FIG. 1H shows the extended TA command having a length of 23 bits, the length only indicates that it is greater than 12 bits of a conventional TA command, and an exact length may vary depending on the case. According to another embodiment of the present disclosure, the extended TA command may indicate a finer relative value with respect to the currently applied TA value. The UE may start a synchronization timer when receiving the extended TA command.

Figure 1I:
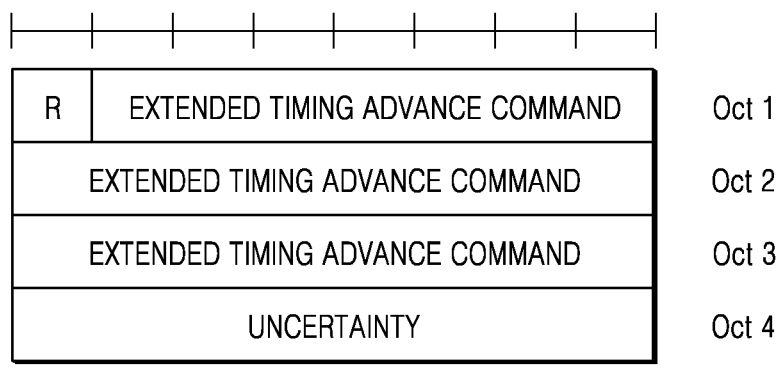
FIG. 1I is a diagram illustrating a format of an extended TA command message according to an embodiment of the present disclosure.

FIG. 1I is a diagram illustrating a format of an extended TA command message according to an embodiment of the present disclosure.

In the related art, when a UE transmits a RA preamble, a base station may transmit a TA command message in response thereto to enable the UE to adjust a TA value indicating the time at which the UE starts transmission to the base station. Such a TA command may be transmitted in the form of a MAC CE. However, if a finer TA value is required, a length of a TA command value in the TA command message may need to be changed. In this regard, a finer TA command value may have a length greater than 12 bits of a conventional TA command. In an embodiment of the present disclosure, in FIG. 1I, a finer TA command value having a great length is referred to as an extended TA command. Although FIG. 1I shows the extended TA command having a length of 23 bits, the length only indicates that it is greater than 12 bits of the conventional TA command, and the exact length may vary depending on the case. When the base station is not able to support the accuracy of a TA command supported via a length of an extended TA command field, a field separately indicating the accuracy of the TA command actually supported by the base station is required. This is referred to as an uncertainty field in FIG. 1I. For example, if the extended TA command is expressed in units (multiples) of 10 ns, but the accuracy of a propagation delay supported by the base station is 40 ns, the uncertainty field may be set to a value corresponding to 40 ns. The value of this uncertainty field may be set to a multiple of a unit of an uncertainty value. In another embodiment of the present disclosure, the extended TA command may indicate a finer relative value with respect to the currently applied TA value. The UE may start a synchronization timer when receiving the extended TA command.

Figure 1J:
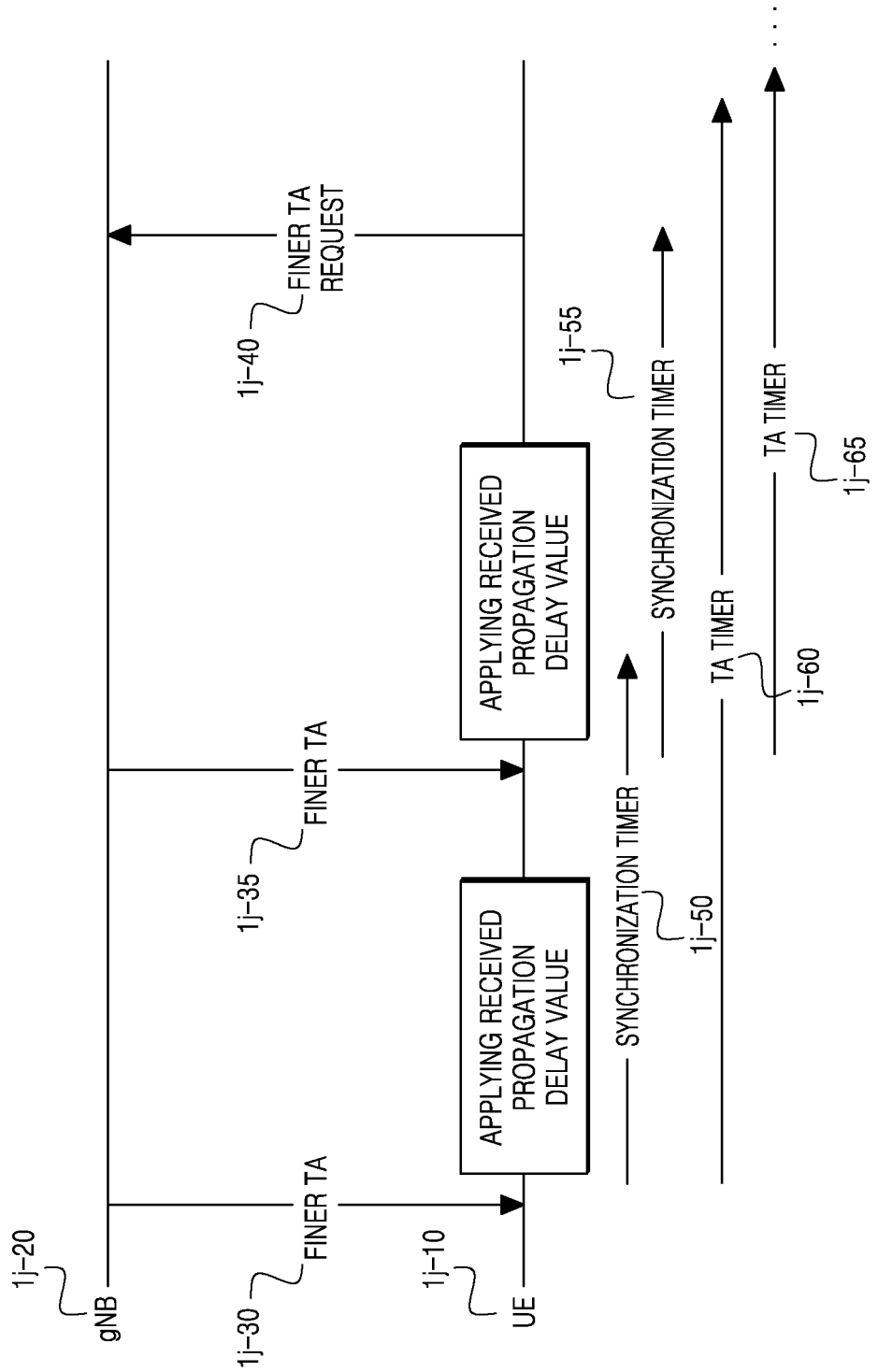
FIG. 1J is a diagram illustrating a detailed operation of a synchronization timer according to an embodiment of the present disclosure.

FIG. 1J is a diagram illustrating a detailed operation of a synchronization timer according to an embodiment of the present disclosure.

Upon receiving a finer TA value or propagation delay value from a base station 1*j*-20 (1*j*-30, 1*j*-35), a UE 1*j*-20 may apply the propagation delay value (1*j*-30 and 1*j*-35). Such a finer TA value or propagation delay may be valid information only for a certain period of time due to movement of the UE or other error factors. In order to manage such an effective time, the UE 1*j*-10 may receive the finer TA value or propagation delay, and start (1*j*-50) or restart (1*j*-55) a synchronization timer when applying this value. When the synchronization timer is running, this may mean that the UE is applying the current propagation delay as a valid value. Upon receiving an extended TA command value, the UE may also update a TA value, and in this case, start (1*j*-60) or restart (1*j*-65) a TA timer (TimingAdvanceTimer) that manages a validity period of the TA value.

Thereafter, when the synchronization timer expires, the UE may determine that the synchronization timer is no longer valid and transmit a message requesting a finer TA value to the base station (1*j*-40). In another embodiment of the present disclosure, instead of transmitting a message requesting a finer TA value, the UE may transmit a RA preamble to the base station by triggering a RA procedure in which the finer TA value can be measured.

FIG. 1K is a diagram illustrating a method of applying finer time information, according to an embodiment of the present disclosure.

To operate by connecting to URLLC services or a TSN network, a UE 1*k*-10 needs to obtain accurate time information working in a communication system. The time information necessary for the UE to operate by connecting to the URLLC services or the TSN network requires an accuracy of the order of several ns to several hundreds of ns. If such accuracy is not guaranteed, the QoS requirements of the URLLC services or TSN may not be satisfied. To this end, as shown in FIG. 1B, the base station may transmit the finer time information 1*b*-30 to the UE. However, if a propagation delay between the base station and the UE is not properly compensated for, the time information transmitted from the base station to the UE has an error. Therefore, the UE needs to apply a propagation time with a finer degree of accuracy by using finer propagation delay information.

In some cases, it may be difficult for the base station to know which UE requires finer propagation delay information. Accordingly, the UE 1*k*-10 may transmit, to a base station 1*k*-20, whether it requires finer propagation delay information. In other words, the UE may request a finer propagation delay value from the base station (1*k*-30). A propagation delay request message requesting the finer propagation delay value may include information indicating that the corresponding UE requires a finer propagation delay, as well as an accuracy value for the finer propagation delay required by the UE. The propagation delay request message may also include an accuracy value for a propagation delay desired by the UE. This accuracy value may be replaced with a value such as Uncertainty according to an embodiment. The propagation delay request message requesting the finer propagation delay may be transmitted in the form of a UE Assistance Information message or a MAC CE.

Thereafter, the base station may measure a propagation delay between the UE and the base station. To measure the propagation delay, the base station may allocate a part of a specific physical channel to the UE (1*k*-40). In the related art, a base station may allocate a RA resource to a UE, and the RA resource is allocated for the purpose of applying a TA value indicating the time at which the UE starts UL transmission to the base station. However, according to an embodiment of the present disclosure, a RA resource is for the purpose of, when applying time information transmitted by the base station to the UE, applying the time information by compensating for a propagation delay, which may not be directly related to determining the time when UL transmission starts by applying a TA value. In addition, the time information 1*b*-30 transmitted by the base station to the UE may be required to have a finer degree of accuracy than a TA value. Accordingly, a time measurement signal 1*k*-50 transmitted for propagation delay measurement, which is performed on radio resources for physical delay measurement, may have a different accuracy from that of an existing RA resource. Such a time measurement signal may be one of a SRS resource, a DMRS resource, a PUSCH resource, and a PUCCH resource. The base station 1*k*-20 that has received the time measurement signal may transmit a propagation delay value to the UE (1*k*-60). Such a propagation delay value may be transmitted in the form of a MAC CE. In another embodiment of the present disclosure, a finer TA value may be included instead of propagation delay information, and in this case, the UE may use a half of the TA value as a propagation delay. In another embodiment of the present disclosure, when TA command value information is included for a TA value, the UE may derive the TA value through a TA command value.

According to an embodiment of the present disclosure, an accuracy or uncertainty value for a propagation delay may be transmitted in a propagation delay message. The accuracy or uncertainty value may include a time unit or the exact number of digits indicating how accurate the transmitted propagation delay is. Thereafter, the UE may apply the time information 1*b*-30 transmitted by the base station by using the received propagation delay value (1*k*-70). This propagation delay value may be used to correct the time information transmitted by the base station.

Because a propagation delay measured once may vary for the UE having mobility, the UE may have to receive a propagation delay again from the base station. To achieve this, the UE may transmit a message requesting a finer propagation delay to the base station (1*k*-30) or retransmit the time measurement signal for propagation delay measurement (1*k*-50). In order to adjust the frequency of transmission or retransmission, the UE may have a synchronization timer 1*k*-80. The UE may start or restart the synchronization timer when receiving the finer propagation delay information, and when the synchronization timer expires, the UE may transmit a message requesting a finer propagation delay to the base station (1k-30), or retransmit the time measurement signal for propagation delay measurement (1k-50). The synchronization timer may have a duration shorter than or equal to a TA timer. When receiving the propagation delay value, the UE may also start or restart a TA timer (not shown).

Figure 1L:
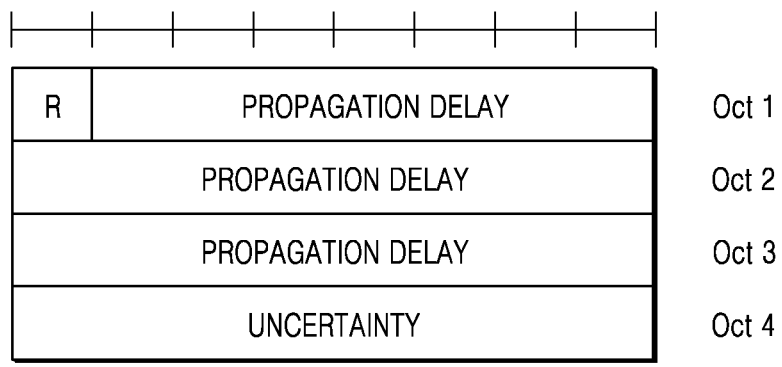
FIG. 1L is a diagram illustrating a format of a propagation delay message according to an embodiment of the present disclosure.

FIG. 1L is a diagram illustrating a format of a propagation delay message according to an embodiment of the present disclosure.

In the related art, a base station transmits a propagation delay message in order to compensate for a propagation delay measured by the base station itself or in response to a time measurement signal transmitted by a UE, so that the UE may adjust the propagation delay. Such a propagation delay message may be transmitted in the form of a MAC CE or DL control information (DCI). Although FIG. 1L shows a propagation delay having a length of 23 bits, the exact length may vary depending on the case. When the base station is not able to support the accuracy of a propagation delay supported via a propagation delay message, a field separately indicating the accuracy of the propagation delay actually supported by the base station is required. This is referred to as an uncertainty field in FIG. 1L. For example, if a propagation delay field included in the propagation delay message is expressed in units (multiples) of 10 ns, but the accuracy of a propagation delay supported by the base station is 40 ns, the uncertainty field may be set to a value corresponding to 40 ns. The value of this uncertainty field may be set to a multiple of a unit of the uncertainty value. The UE may start a synchronization timer when receiving the propagation delay message.

Figure 1M:
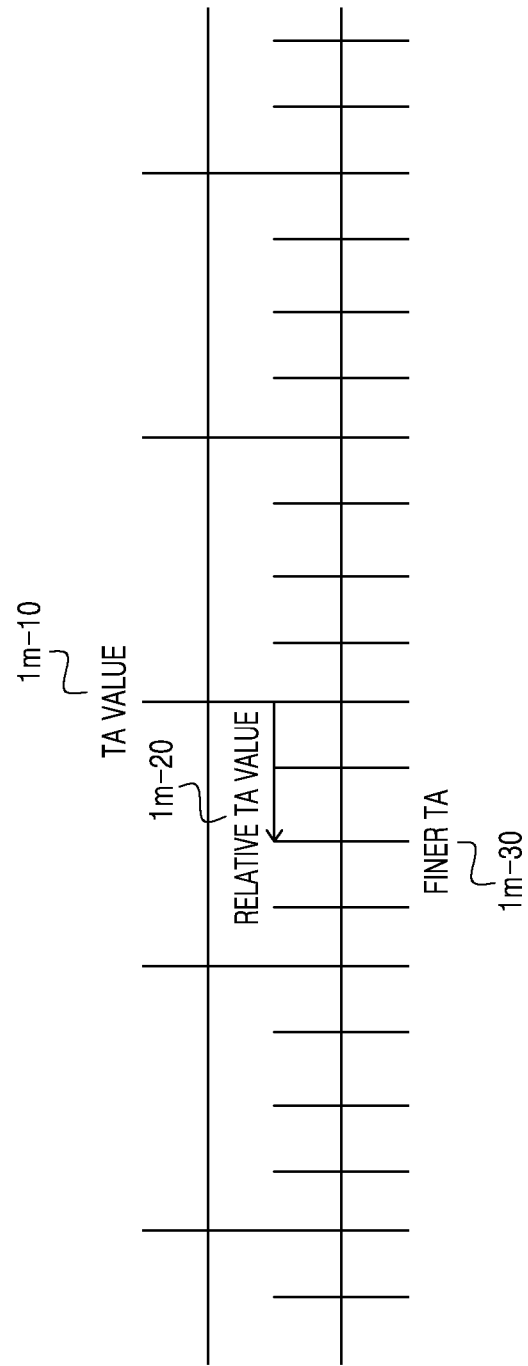
FIG. 1M illustrates a method of applying a finer TA value, according to an embodiment of the present disclosure.

FIG. 1M illustrates a method of applying a finer TA value, according to an embodiment of the present disclosure.

Conventionally, a TA value obtained using RA or a TA command may not guarantee a sufficient accuracy to be used as a finer propagation delay for synchronization. To this end, the accuracy of a TA value may be increased by transmitting a relative TA value 1m-20 having a finer degree of accuracy than an existing TA value. A finer TA value 1m-30 may be calculated by applying the relative TA value based on a previously set TA value. At this time, because the relative TA value 1m-20 is transmitted in a smaller time unit than the existing TA value 1m-10, the UE may calculate a finer propagation delay based on the calculated finer TA value 1m-30. In some cases, the propagation delay may be applied as a half of the finer TA value.

Figure 1N:
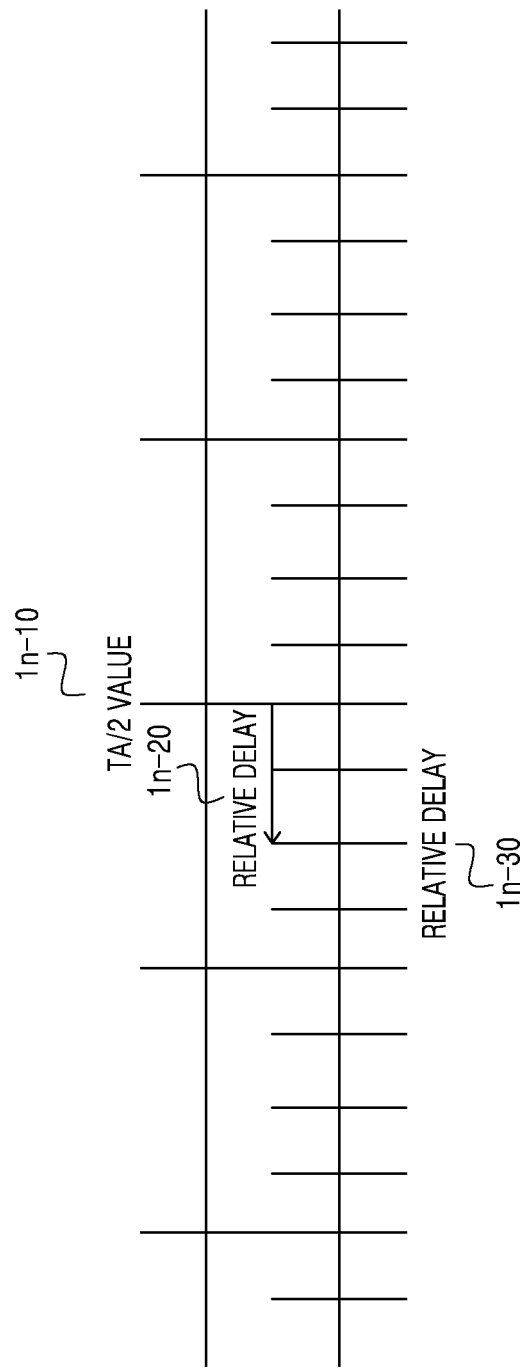
FIG. 1N illustrates a method of applying a finer propagation delay value, according to an embodiment of the present disclosure.

FIG. 1N illustrates a method of applying a finer propagation delay value, according to an embodiment of the present disclosure.

Conventionally, a TA value obtained using RA or a TA command may not guarantee a sufficient accuracy to be used as a finer propagation delay for synchronization. To this end, the accuracy of a propagation delay may be increased by transmitting a relative propagation delay 1n-20 having a finer degree of accuracy than a half of an existing TA value 1n-10 used as a propagation delay. In this case, In this case, a finer propagation delay value 1n-30 may be calculated by applying a relative propagation delay value based on a half of a previously set TA value. Because a relative propagation delay 1n-20 is transmitted in a smaller time unit than the half of the existing TA value 1n-10, the UE may calculate the finer propagation delay based on a calculated finer TA value 1n-30.

Figure 1O:
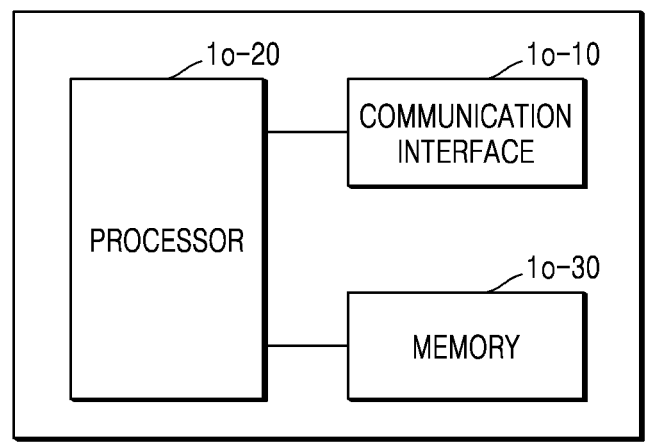
FIG. 1O is a diagram illustrating a structure of a UE according to an embodiment of the present disclosure.

FIG. 1O is a diagram illustrating a structure of a UE according to an embodiment of the present disclosure.

Referring to FIG. 1O, a UE 1o-40 may include a communication interface 1o-10, a processor 1o-20, and a memory 1o-30. However, the UE 1o-40 is not limited to the above-described example, and may include more or fewer components than those show in FIG. 1O.

The communication interface 1o-10 may transmit and receive signals to and from other network entities. For example, the communication interface 1o-10 may receive, from a base station, system information as well as a synchronization signal or a reference signal.

The processor 1o-20 may control all operations of the UE according to an embodiment of the present disclosure. For example, the processor 1o-20 may control a flow of signals between blocks so that the UE performs operations according to the above-described flowcharts.

The memory 1o-30 may store at least one of information transmitted and received via the communication interface 1o-10 and information generated via the processor 1o-20.

Figure 1P:
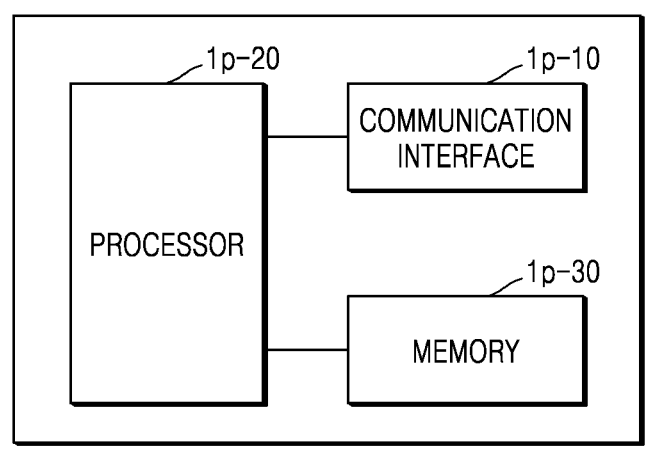
FIG. 1P is a diagram illustrating a structure of a base station according to an embodiment of the present disclosure.

FIG. 1P is a diagram illustrating a structure of a base station according to an embodiment of the present disclosure.

Referring to FIG. 1P, a base station 1p-40 may include a communication interface 1p-10, a processor 1p-20, and a memory 1p-30. However, the base station 1p-40 is not limited to the above-described example, and may include more or fewer components than those show in FIG. 1P.

The communication interface 1p-10 may transmit and receive signals to and from other network entities. For example, the communication interface 1p-10 may transmit, to a UE, system information as well as a synchronization signal or a reference signal.

The processor 1p-20 may control all operations of the base station according to an embodiment proposed in the present disclosure. For example, the processor 1p-20 may control a flow of signals between blocks so that the base station performs operations according to the above-described flowcharts.

The memory 1p-30 may store at least one of information transmitted and received via the communication interface 1p-10 and information generated via the processor 1p-20.

Figure 1Q:
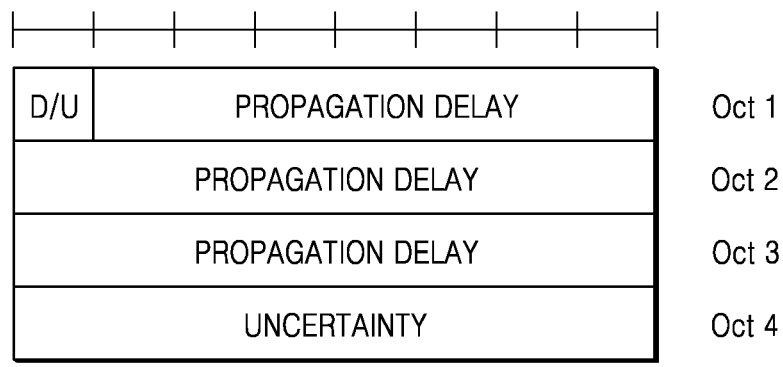
FIG. 1Q is a diagram illustrating a format of a propagation delay message according to an embodiment of the present disclosure.

FIG. 1Q is a diagram illustrating a format of a propagation delay message according to an embodiment of the present disclosure.

In the related art, a base station transmits a propagation delay message in order to compensate for a propagation delay measured by the base station itself or in response to a time measurement signal transmitted by a UE, so that the UE may adjust the propagation delay. Such a propagation delay message may be transmitted in the form of a MAC CE or DCI. In addition, propagation delays may be different in DL an UL.

In detail, FIG. 1O shows an example in which when a propagation delay is transmitted, a propagation delay message includes a D/U field indicating whether the propagation delay is for DL or UL due to different propagation delays in the DL and UL. In an embodiment of the present disclosure, depending on a value of the D/U field, this may mean that a value of a propagation delay field indicates in which direction the propagation delay time is.

In another embodiment of the present disclosure, the base station may transmit, to the UE, propagation delays in UL and DL in the propagation delay message without a separate D/U field. Although FIG. 1Q shows a propagation delay having a length of 23 bits, an exact length thereof may vary depending on the case. When the base station is not able to support the accuracy of a propagation delay supported via the propagation delay message, a field separately indicating the accuracy of the propagation delay actually supported by the base station is required. This is referred to as an uncertainty field in FIG. 1O. For example, if the propagation delay field included in the propagation delay message is expressed in units (multiples) of 10 ns, but the accuracy of a propagation delay supported by the base station is 40 ns, the uncertainty field may be set to a value corresponding to 40 ns. The value of this uncertainty field may be set to a multiple of a unit of the uncertainty value.

According to an embodiment of the disclosure, the UE may start a synchronization timer when receiving the propagation delay message. As described above, when propagation delays in the DL and UL are different from each other, the synchronization timer may have independent synchronization timers for the DL and the UL, or operate for only UL.

Figure 1R:
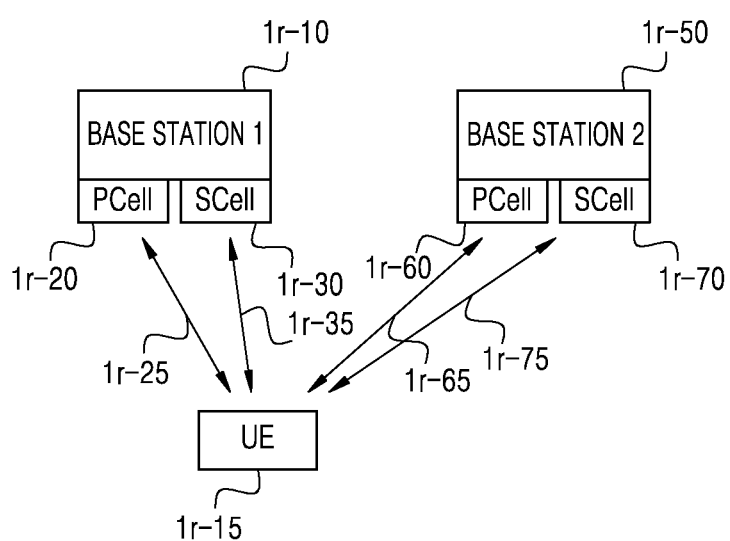
FIG. 1R is a diagram for describing a case in which a time difference occurs between base stations at a reference time point.

FIG. 1R is a diagram for describing a case in which a time difference occurs between base stations at a reference time point.

Referring to FIG. 1R, a UE may be connected to one base station or may be connected to two base stations in a dual connectivity architecture. Furthermore, although the UE is connected to one serving base station, it may perform handover to another base station. Base stations 1r-10 and 1r-50 may be respectively physically installed in different locations, and when the base stations are installed in different locations, it is understood that local operating time of each base station may be different. In addition, the base stations 1r-10 and 1r-50 may operate a plurality of cells 1r-20, 1r-30, 1r-60, and 1r-70, and cells may be classified into PCells 1r-20 and 1r-60, secondary cells (SCells) 1r-30 and 1r-70, a PSCell (not shown), etc.

In each of the base stations 1r-10 and 1r-50, the actual time when each cell operates may be different due to a location constraint on a module of each cell, etc. Accordingly, a start time or an end time of a frame or symbol of each cell may be different. In addition, an error may occur due to a propagation time caused when each cell transmits to the UE. In FIG. 1R, because a path 1r-25 over which the PCell 1r-20 of the base station 1 1r-10 communicates with the UE, a path 1r-35 over which the SCell 1r-30 of the base station 1 1r-10 communicates with the UE, a path 1r-65 over which the PCell 1r-60 of the base station 2 1r-50 communicates with the UE, and a path 1r-75 over which the SCell 1r-70 of the base station 2 1r-50 communicates with the UE are different from one another, a difference in propagation time may occur. Such a difference in propagation time, i.e., a difference in operating time between base stations and between cells, may not have a significant effect on transmission and reception but affect processing of URLLC traffic or TSN protocol. Therefore, an error due to the time difference needs to be reduced, and information of a base station and a cell that a reference time of the time information described with reference to FIG. 1B means needs to be separately specified.

In some cases, a serving base station may inform time information of a target base station before handover occurs. For example, when the UE connected to base station 1 performs handover to base station 2 or when the UE needs to update time information with a reference time of the base station 2 in a situation in which the UE is connected to both base stations 1 and 2, base 1 may transmit, to the UE, reference time information of the base station 2 which is a base station that applies a new reference time. Such information of another base station may be included in the time information message 1b-30 described with reference to FIG. 1B, or may be transmitted in a time information message (e.g., 1s-50) from another base station, as described later with reference to FIG. 1S. The base station may transmit the time information so that the UE may identify it as being time information of the other base station.

According to an embodiment of the present disclosure, time information of another base station further including information for measuring a propagation delay at the other base station may be transmitted to the UE. The information for propagation delay measurement at the other base station may be transmitted which includes information about a physical channel that can be used for propagation delay measurement at another base station (or another cell) or a target base station to which the UE is to be handed over. For example, the physical channel that can be used for propagation delay measurement may be a physical RACH (PRACH), a PUCCH, a SRS, or the like. When it is necessary to measure a DL propagation delay for the UE, a physical channel that can be used for propagation delay measurement may be a PDCCH, a physical DL shared channel (PDSCH), a DMRS, a synchronization signal block (SSB), or the like.

Figure 1S:
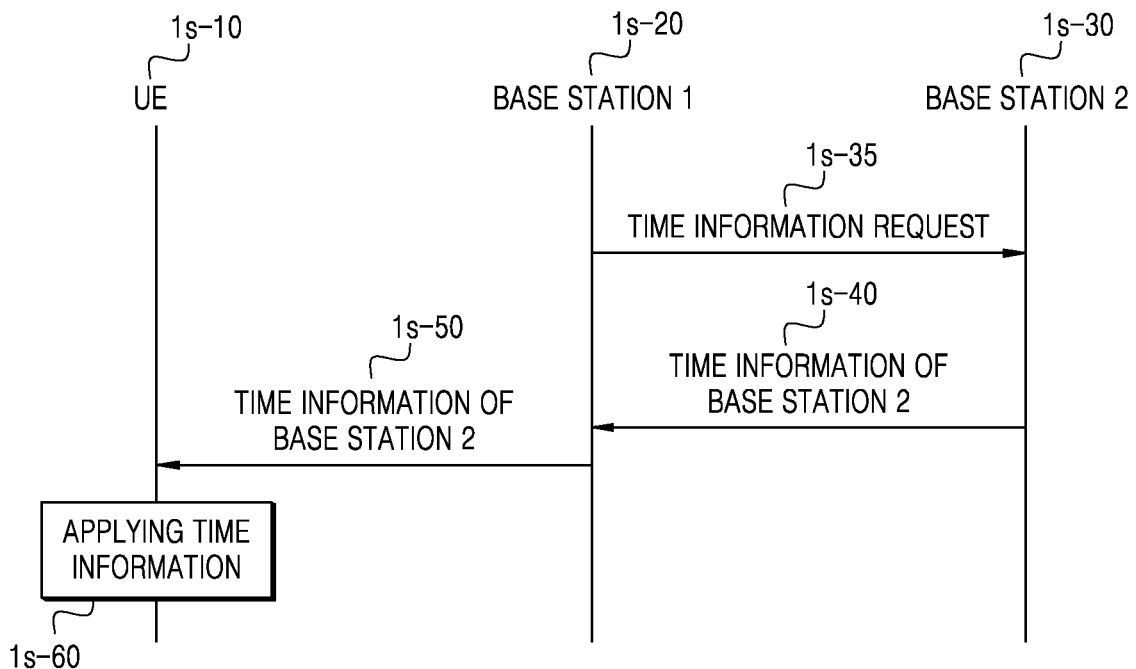
FIG. 1S is a diagram illustrating a procedure for transmitting time information of another base station, according to an embodiment of the present disclosure.

FIG. 1S is a diagram illustrating a procedure for transmitting time information of another base station, according to an embodiment of the present disclosure.

It is assumed in FIG. 1S that a UE 1s-10 is connected to base station 1 1s-20 and is able to receive time information from the base station 1 1s-20. However, the UE 1s-10 may be expected to connect to base station 2 1s-30 for the purpose of dual connectivity or handover. In this case, the UE 1s-10 may receive time information of the base station 2 1s-30 to prepare for processing of URLLC traffic or operation of a TSN protocol via connection to the base station 2 1s-30. Accordingly, the base station 1 1s-20 may transmit a time information request 1s-35 to the base station 2 1s-30.

The time information request 1s-35 may be transmitted in a handover request message transmitted during a handover preparation process. Subsequently, the base station 2 1s-30 may transmit time information used by the base station 2 1s-30 to the base station 1 1s-20 (1s-40). Also, the base station 2 1s-30 may inform the base station 1 1s-20 of a reference time used by the base station 2 1s-30 and a cell of which reference time is the reference time used by the base station 2 1s-30.

In an embodiment of the present disclosure, the base station 1 1s-20 may transmit, to the UE, a message including the time information of the base station 2 1s-30 received from the base station 2 1s-30 (1s-50). The message may include information indicating a cell of a base station whose time information corresponds to the time information. In other words, the message may include a physical cell identifier (ID) (PCI). In another embodiment of the present disclosure, the time information transmitted from the base station 2 1s-30 to the base station 1 1s-20 may be transmitted to the UE 1s-10 in the same manner. Upon receiving the time information from the other base station, the UE 1s-10 may update a corresponding value to apply the time information immediately (1s-60) or after accessing the corresponding base station (1s-60).

Time information of another base station may be transmitted from the other base station to the UE when the UE prepares for handover to the corresponding base station or performs handover thereto. For example, if an Information Element (IE) of time information of a serving base station is TimingReferenceInfo, time information of a target base station may be referred to as TimingReferenceInfoTarget, and in this case, an IE may include time information of the base station to which the UE is to perform handover. The time information of the target base station may be transmitted in a radio resource control (RRC) reconfiguration message including mobility control information, a reconfiguration with sync message, or a handover command message which is a message for handover.

In an embodiment of the present disclosure, time information of another base station may be transmitted as system information. For example, each TimingReferenceInfo IE may be classified by a PCI or a base station ID to transmit time information of one or more other base stations. In addition, the time information of the other base station further including information for propagation delay measurement at the other base station may be transmitted to the UE. For example, the information for propagation delay measurement may include information about a physical channel that can be used for propagation delay measurement at another base station (or another cell) or a target base station to which the UE is to be handed over. The physical channel that can be used for propagation delay measurement may be a PRACH, a PUCCH, a SRS, or the like. When it is necessary to measure a DL propagation delay for the UE, a physical channel that can be used for propagation delay measurement may be a PDCCH, a PDSCH, a DMRS, a SSB, or the like. By using the pieces of information, the UE may measure and compensate for a propagation delay after handover or at the other base station 1s-30. In another embodiment of the present disclosure, another base station 1k-10 may have to transmit the time measurement signal 1k-50 to the UE 1k-10. In the UL, the UE may apply time information of the new base station after obtaining propagation delay information.

Figure 2A:
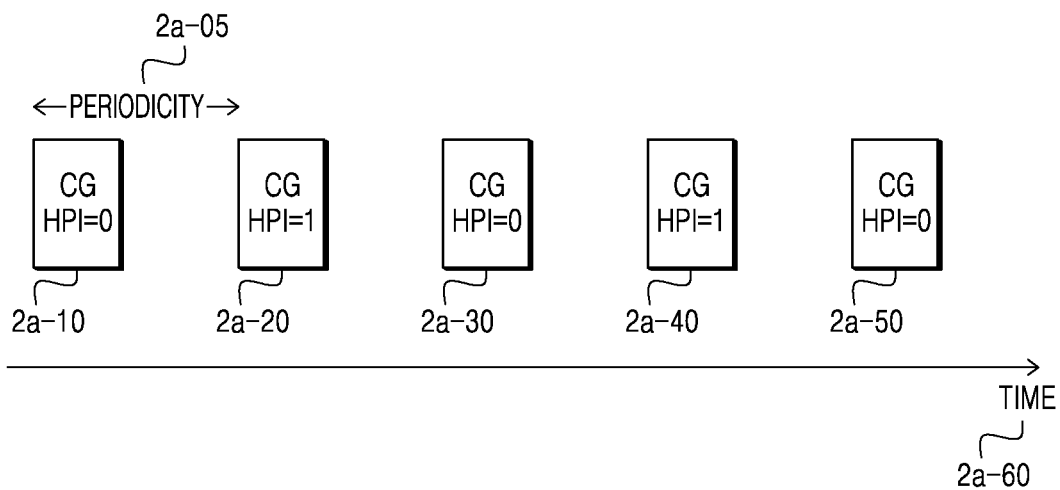
FIG. 2A is a diagram illustrating an operation of configuring a configured grant (CG) and a hybrid automatic repeat request (HARQ) process, according to an embodiment of the present disclosure.

FIG. 2A is a diagram illustrating an operation of configuring a configured grant (CG) and a hybrid automatic repeat request (HARQ) process, according to an embodiment of the present disclosure.

CGs 2a-10, 2a-20, 2a-30, 2a-40, and 2a-50 of FIG. 2A are configured to have a certain periodicity 2a-05 on a time axis 2a-60. According to an embodiment of the present disclosure, a base station may configure each CG for a UE, and configure a periodicity, a location and a size of a radio resource, modulation, a coding rate, etc. Such a CG may be configured in both a licensed spectrum and an unlicensed spectrum. In some cases, such a CG may be activated immediately upon configuration or may be activated by a separate activation command. A wireless communication system may have a CG that is activated immediately upon configuration without a separate procedure, and such a CG may be referred to as a CG type 1. On the other hand, the wireless communication system may have a CG that is activated by a separate signal such as DCI or the like, and such a CG may be referred to as a CG type 2. An activation message for the CG type 2 may include at least one of a detailed resource location or modulation and coding scheme (MCS) information. A CG may be assumed to have a fixed traffic pattern or to be used for high-priority data. In a particular case, the CG may be dedicated to data having a short delay requirement. To meet the short delay requirement, the base station may configure whether a specific CG can be used for each specific logical channel via an RRC configuration message. In some cases, the UE may be configured with a plurality of CGs, and at this time, a periodicity, radio resource location and size, modulation, a coding rate, etc., for each CG may be differently configured.

In an embodiment of the present disclosure, one or more HARQ processes may be used for a CG. Available HARQ processes may be configured by the base station upon configuration of CG resources. A HARQ process to be used for a CG may be determined by the number of available HARQ processes and an HARQ process ID offset. In detail, a HARQ process having a HARQ process ID (or HPI) with a value from a HARQ process ID offset value to a value corresponding to (HARQ process ID offset)+(the number of available HARQ processes)−1 may be used for a CG. In FIG. 2A, it is assumed that the HARQ process ID offset is set to 0 and the number of available HARQ processes is set to 2. Therefore, two HARQ processes having HARQ process IDs with values from 0 to 1 are used alternately for a CG.

In another embodiment of the present disclosure, when configuring a CG in an unlicensed spectrum, a method of determining such an HARQ process ID may be applied differently. In the unlicensed spectrum, because the UE transmit a CG including HAQR process ID (or HPI) information to the base station upon CG transmission, a value of a HARQ process ID may not be used alternately. In this case, the UE may determine a HPI according to the presence or absence of data in a HARQ buffer of a HARQ process to use it for CG transmission and transmit the CG including a value of the HARQ process ID to the base station.

Figure 2B:
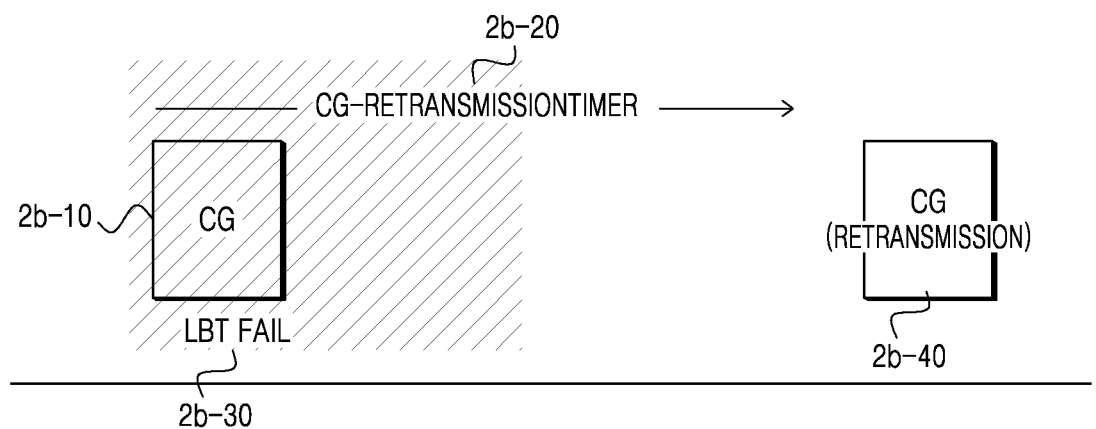
FIG. 2B illustrates a method of performing retransmission on a CG in an unlicensed spectrum, according to an embodiment of the present disclosure.

FIG. 2B illustrates a method of performing retransmission on a CG in an unlicensed spectrum, according to an embodiment of the present disclosure.

An unlicensed spectrum may be shared with other communication systems. Therefore, in order to use the unlicensed spectrum, it is necessary to perform a listen before talk (LBT) procedure for checking whether the unlicensed spectrum is in use and performing communication only when it is available. Transmission using a UL grant is determined in the LBT procedure, and then is performed during an actual transmission procedure. Therefore, a series of operations such as generation of a MAC protocol data unit (PDU) for UL transmission, etc. may be completed before determining an LBT failure.

When a CG 2b-10 is configured in an unlicensed spectrum and the UE determines transmission on the CG 2b-10, the CG 2b-10 may not be successfully transmitted due to an LBT failure. When the LBT failure 2b-30 occurs at the time including the transmission on the CG 2b-10, retransmission on the CG 2b-10 may be required. However, during a time period when the LBT failure 2b-30 remains valid, retransmission on the corresponding CG does not occur. As described above, when the LBT failure 2b-30 occurs, a MAC PDU to be transmitted on the CG 2b-10 may have already been generated. Therefore, the MAC PDU needs to be transmitted. However, it is difficult for the base station to know whether the UE has generated a MAC PDU to be transmitted on the CG 2b-10. In addition, a retransmission resource transmitted by the base station may not be delivered to the UE due to the LBT failure. Therefore, in the unlicensed spectrum, the UE may autonomously perform an operation of retransmitting the generated MAC PDU on a next CG resource 2b-40.

In another embodiment of the present disclosure, after transmission on a CG is not performed due to an LBT failure or other transmission failures, the UE may perform retransmission using a dynamic grant allocated by the base station via a configured scheduling RNTI (CS-RNTI). In order to indicate the time when the base station allocates retransmission resources, the UE may start a CG-RetransmissionTimer 2b-20 at a time point when the UE indicates CG transmission to lower layers. In a specific case, the CG-RetransmissionTimer 2b-20 may be started only when an LBT failure does not occur. In addition, after expiry of the CG-RetransmissionTimer 2b-20, retransmission on the CG 2b-10 which was not performed due to the LBT failure or other transmission failures, may be performed on the next CG resource 2b-40. At this time, the UE may set a HARQ process ID for the CG to a HARQ process ID for the CG resource 2b-10 which fails to be transmitted due to the LBT failure, and inform the base station of transmission using the HARQ process ID.

Figure 2C:
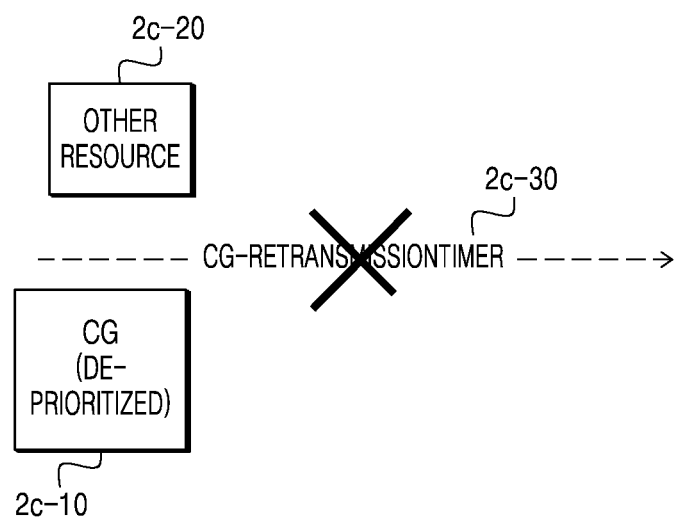
FIG. 2C illustrates a logical channel-based prioritization operation in an unlicensed spectrum, according to an embodiment of the present disclosure.

FIG. 2C illustrates a logical channel-based prioritization operation in an unlicensed spectrum, according to an embodiment of the present disclosure.

Data for a URLLC service has low latency requirements, and in order to satisfy the low latency requirements, more resources than needed for actually generated data may be allocated. Because a larger amount of radio resources than required by actually generated data are allocated, some resources may be allocated to overlap with other resources on the time axis (or time and frequency axes), but this may not increase latency greatly.

In an embodiment of the present disclosure, it is assumed in FIG. 2C that a CG 2c-10 overlaps with another UL resource 2c-20 on the time axis. In a case that the UL resource 2c-20 is a UL grant (which refers to a UL resource allocated using a UL grant and transmitted on a PUSCH; the same applies hereinafter) transmitted on the PUSCH, the UL resource 2c-20 may overlap with the CG 2c-10 on the time axis within the same bandwidth part (BWP). In a case that the UL resource 2c-20 is a scheduling request (SR) resource transmitted on a PUCCH, the UL resource 2c-20 may overlap with the CG 2c-10 on the time axis within the same MAC entity.

In an embodiment of the present disclosure, when two UL resources overlap, a resource having a higher priority (i.e., a lower priority value) may be prioritized and actually transmitted. On the other hand, non-prioritized UL resource may be a de-prioritized resource. In this case, the priority of the UL grant transmitted on the PUSCH may be determined by a highest priority among priorities of logical channels that can be transmitted using the UL resource 2c-20. The priority of the SR resource transmitted on the PUCCH may be determined by a priority of a logical channel triggering an SR request message.

In FIG. 2C, it is assumed that the CG resource 2c-10 overlaps with the other resource 2c-20 on the time axis, the other resource has a higher priority than that of the CG, and the other resource 2c-20 is a prioritized UL grant or a prioritized SR transmission. At this time, the CG 2c-10 configured in the unlicensed spectrum is a de-prioritized UL grant. As described above, when the CG resource 2c-10 is a de-prioritized UL grant, it means that actual transmission is not performed, so a CG-RetransmissionTimer 2c-30 does not need to be started. Therefore, when the CG resource is a de-prioritized UL grant in the unlicensed band, the CG-RetransmissionTimer 2c-30 may not be started. Because the CG-RetransmissionTimer 2c-30 is not started, the UE may immediately perform retransmission using the CG 2c-10 when valid UL transmission occurs later.

Figure 2D:
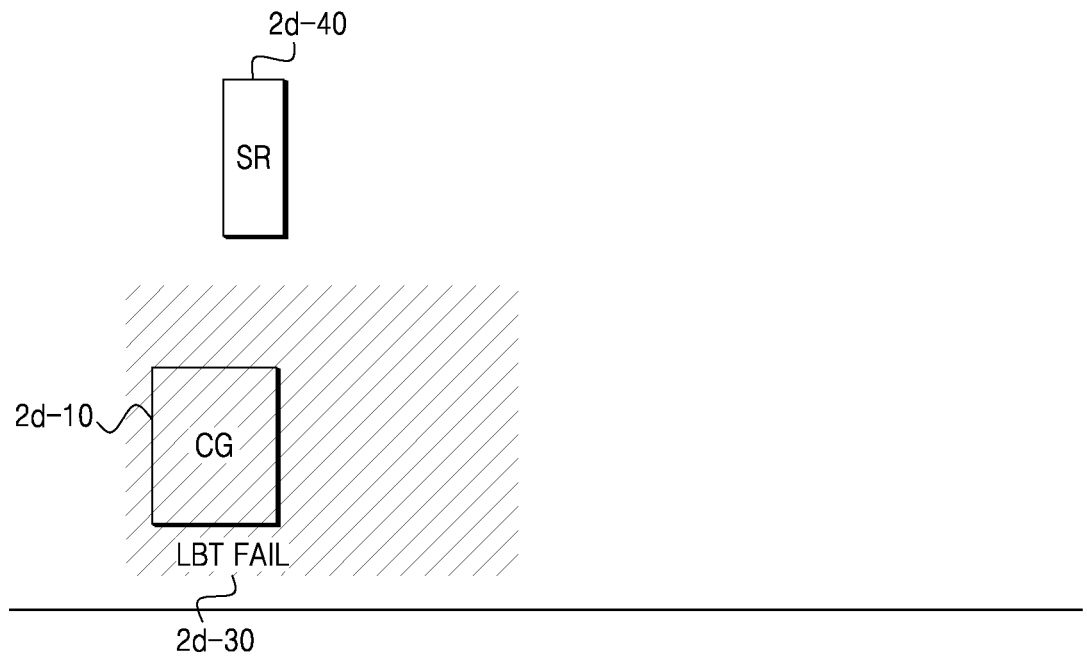
FIG. 2D illustrates a logical channel-based prioritization operation in an unlicensed spectrum, according to an embodiment of the present disclosure.

FIG. 2D illustrates a logical channel-based prioritization operation in an unlicensed spectrum, according to an embodiment of the present disclosure.

Data for a URLLC service has low latency requirements, and in order to satisfy the low latency requirements, more resources than needed for actually generated data may be allocated. Because a larger amount of radio resources than required by actually generated data are allocated, some resources may be allocated to overlap with other resources on the time axis (or time and frequency axes), but this may not increase latency greatly.

In an embodiment of the present disclosure, it is assumed in FIG. 2D that a CG 2d-10 overlaps with an SR resource 2d-40 on another cell on the time axis. When two UL resources overlap, a resource having a higher priority (i.e., a lower priority value) may be prioritized and actually transmitted. On the other hand, a non-prioritized UL resource may be a de-prioritized resource. The priority of a UL grant, including a CG, transmitted on a PUSCH may be determined by a highest priority among priorities of logical channels that can be transmitted using UL grants. The priority of an SR resource transmitted on a PUCCH may be determined by a priority of a logical channel triggering an SR request message.

According to an embodiment of the present disclosure, it is assumed in FIG. 2D that the CG 2d-10 is configured in an unlicensed spectrum, but an LBT failure 2d-30 occurs during a transmission attempt. In this case, the CG 2d-10 may not actually be transmitted. In a case that a CG resource is a prioritized UL grant, another UL resource overlapping with the CG resource on the time axis within the same BWP is a de-prioritized UL grant, and the SR transmission resource 2b-40 overlapping therewith on the time axis within the same MAC entity is a de-prioritized SR transmission. However, because the LBT failure occurs in the unlicensed spectrum in which the prioritized UL grant occurs, CG 2d-10 cannot be transmitted.

In this case, a problem occurs in that although SR transmission is allowed, transmission is not performed because the SR transmission is de-prioritized due to the CG. Therefore, according to an embodiment of the present disclosure, when LBT failure indication is received, the CG resource that fails to be transmitted as a result of an LBT procedure needs to be a de-prioritized UL grant. As the CG resource is a de-prioritized UL grant, the SR transmission resource is a prioritized SR transmission so that transmission may be performed. That is, this may solve the problem in that even though the SR transmission is possible, transmission is not performed because the SR transmission is de-prioritized due to the CG.

In FIG. 2D, only the LBT failure for transmission on the CG resource is considered, but according to another embodiment of the present disclosure, the CG resource may be a de-prioritized UL grant if an LBT failure for a dynamic grant resource is indicated. Therefore, when determining whether SR transmission on an SR transmission resource is prioritized, a resource on a BWP (or a cell) for which the LBT failure is indicated may be excluded from prioritization operation even if the resource overlaps on the time axis. That is, if i) the LBT failure for SR transmission is not indicated, ii) if the SR transmission was not a de-prioritized UL grant (or SR transmission), and iii) if there is no UL grant (SR transmission) having a higher priority among UL grants and SR transmissions overlapping on the time axis, the corresponding SR transmission may be determined as a prioritized SR transmission.

Figure 2E:
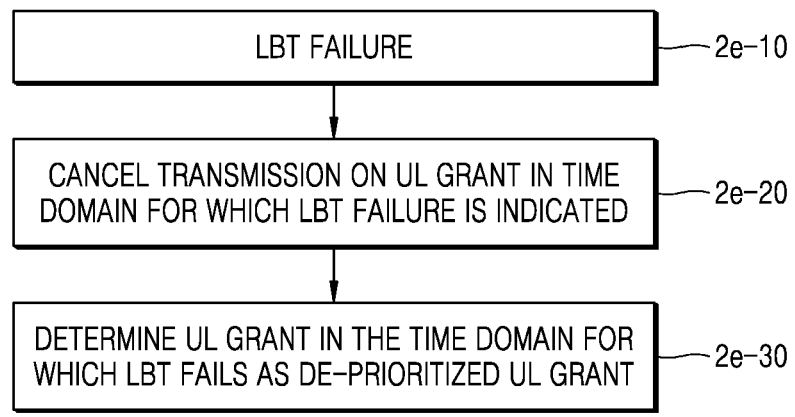
FIG. 2E illustrates a logical channel-based prioritization operation in an unlicensed spectrum, according to an embodiment of the present disclosure.

FIG. 2E illustrates a logical channel-based prioritization operation in an unlicensed spectrum, according to an embodiment of the present disclosure.

A 5th generation (5G) communication UE may simultaneously use cells in both a licensed spectrum and an unlicensed spectrum by using a carrier aggregation (CA) technique. When the CA technique is used, even if an LBT failure occurs on a cell in an unlicensed spectrum (2e-10), transmission may be continuously performed on another cell where the LBT failure does not occur. To this end, when the LBT failure occurs, the UE may cancel transmission on a UL grant in the time domain for which the LBT failure is indicated (2e-20). Canceling the transmission on the UL grant may be understood as canceling transmission of a MAC PDU to be transmitted using a UL grant in the time domain where the LBT failure is indicated (i.e., a UL grant for which the LBT failure is indicated). Also, cancellation of MAC PDU transmission may mean that MAC service data units (MAC SDUs) and MAC CEs included in the MAC PDU are included in another MAC PDU and transmitted. In other cases, a UL grant in the time domain for which the LBT failure is indicated may be used in the same sense as a MAC PDU in a buffer associated with a HARQ process ID of the UL grant in the time domain for which the LBT failure is indicated. The UL grant in the time domain for which the LBT failure is indicated may be considered as a de-prioritized UL grant. In some cases, the UL grant in the time domain for which the LBT failure is indicated may be determined as a de-prioritized UL grant (2e-30).

Figure 2F:
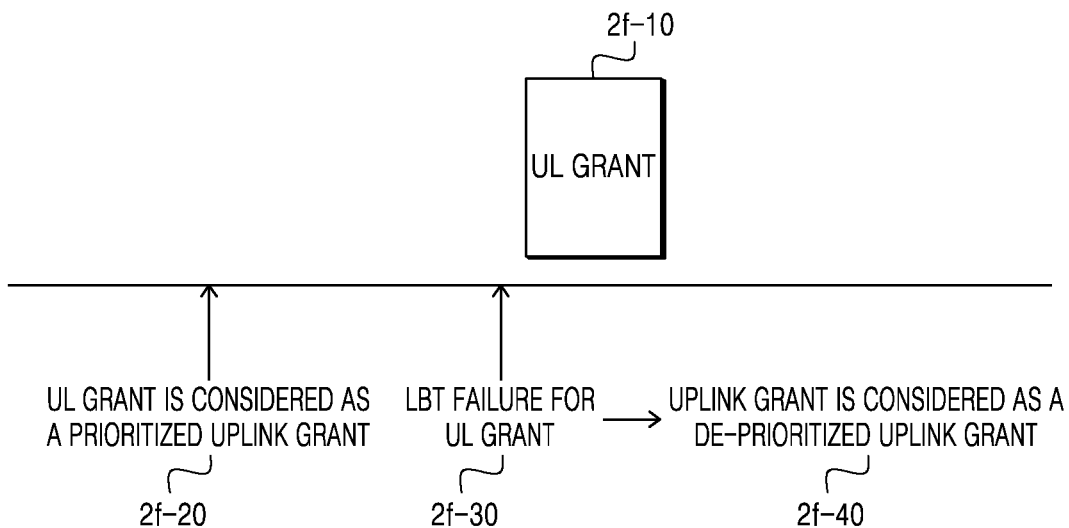
FIG. 2F illustrates a logical channel-based prioritization operation in an unlicensed spectrum, according to an embodiment of the present disclosure.

FIG. 2F illustrates a logical channel-based prioritization operation in an unlicensed spectrum, according to an embodiment of the present disclosure.

A 5G communication UE may simultaneously use cells in both a licensed spectrum and an unlicensed spectrum by using a carrier aggregation (CA) technique. When the CA technique is used, even if an LBT failure occurs on a cell in an unlicensed spectrum, transmission may be continuously performed on another cell where the LBT failure does not occur. However, when a MAC PDU is generated for transmission on the cell where the LBT failure occurs, data of the MAC PDU is difficult to transmit on another cell. In addition, when there is a prioritized UL grant on a cell, a scheduling request transmission on another cell becomes a de-prioritized scheduling request and cannot be transmitted. Therefore, when the LBT failure occurs, a corresponding UL grant and a MAC PDU transmitted on the corresponding UL grant need to be de-prioritized.

When the UE is allocated a UL grant 2f-10 by the base station, the UE needs to determine when the UL grant 2f-10 is prioritized. In this case, the UL grant 2f-10 may be determined as a prioritized UL grant 2f-20. Unless there are special circumstances, actual transmission on the UL grant 2f-20 needs to be performed, but the LBT failure may occur in an unlicensed spectrum. The LBT failure 2f-30 means that the UL grant 2f-20 cannot be transmitted. In this case, the UL grant 2f-20 may be changed again to a de-prioritized UL grant 2f-40. Changing again to a de-prioritized UL grant in this way may enable transmission of an SR message transmitted on another cell.

Figure 2G:
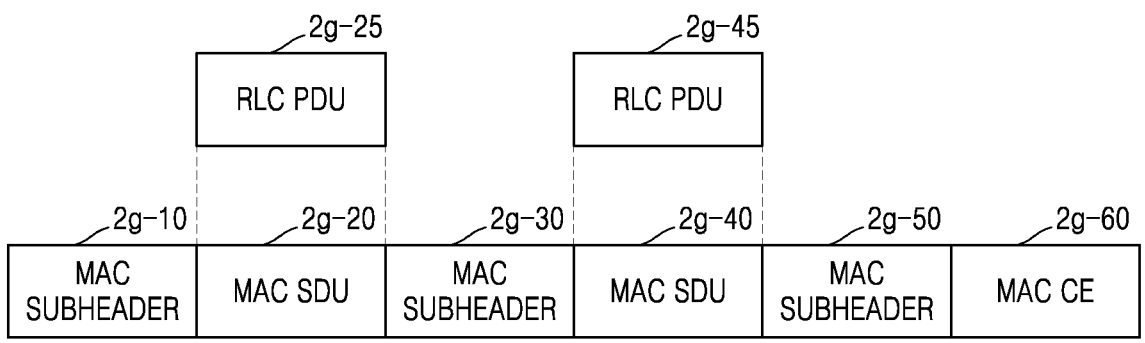
FIG. 2G illustrates a process of an operation when listen before talk (LBT) fails in an unlicensed spectrum, according to an embodiment of the present disclosure.

FIG. 2G illustrates a process of an operation when LBT fails in an unlicensed spectrum, according to an embodiment of the present disclosure.

A UL grant may be transmitted in units of a transport block, and the transport block corresponds in a one-to-one manner to a MAC PDU. In other words, the MAC PDU may be transmitted using the UL grant. The MAC PDU may be transmitted which includes MAC SDUs 2g-20 and 2g-40 representing logical channel data and a MAC CE 2g-60 representing MAC layer control information. The MAC SDUs and the MAC CE may respectively include MAC subheaders 2g-10, 2g-30, and 2g-50 immediately in front of them. Accordingly, a MAC subheader may indicate what kind of information is a MAC SDU or MAC CE coming thereafter. The MAC CE is information used in a MAC layer, but the MAC SDUs are information formed by and received from a radio link control (RLC) layer, which is an upper layer, and are the same as RLC PDUs 2g-25 and 2g-45.

In a case that the MAC PDU is generated and stored in a HARQ buffer, the RLC layer does not deliver the same RLC PDU to the MAC layer unless indication such as retransmission indication is received. However, in a case that a RLC PDU (MAC SDU) delivered to the MAC layer and included in a MAC PDU is not transmitted by the MAC layer due to an LBT failure, the MAC SDU cannot be transmitted until the LBT succeeds and data is transmitted, which may result in transmission delay. Thus, when an LBT failure is indicated for a UL grant for transmitting the MAC PDU, MAC SDUs included in the MAC PDU need to be retransmitted by the RLC layer. In other words, it is necessary to multiplex and transmit MAC SDUs (RLC PDUs) on another UL grant. For example, when the LBT failure is indicated for the UL grant for transmitting the MAC PDU, RLC SDUs may be retransmitted by the RLC layer instead of the RLC PDUs, or the MAC SDUs included in the MAC PDU may be delivered to the RLC layer or a packet data convergence protocol (PDCP) layer that is an upper layer so that they are retransmitted. In this case, transmission at the RLC layer may be understood as sending (submitting) data (RLC SDUs or RLC PDUs) to the MAC layer that is a lower layer.

Figure 2H:
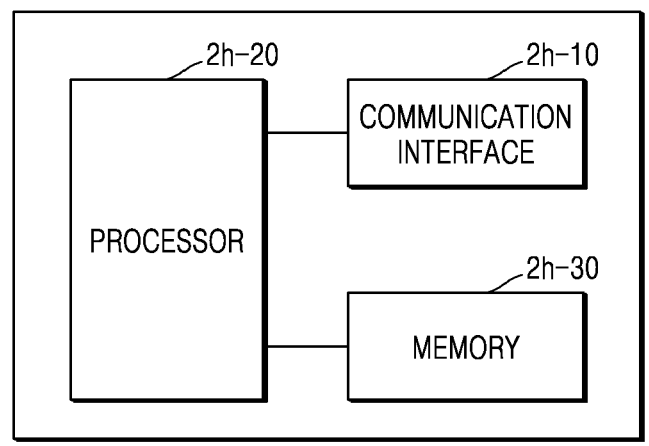
FIG. 2H is a diagram illustrating a structure of a UE according to an embodiment of the present disclosure.

FIG. 2H is a diagram illustrating a structure of a UE according to an embodiment of the present disclosure.

Referring to FIG. 2H, a UE 2h-40 may include a communication interface 2h-10, a processor 2h-20, and a memory 2h-30.

The communication interface 2h-10 may transmit and receive signals to and from other network entities. For example, the communication interface 2h-10 may receive, from a base station, system information as well as a synchronization signal or a reference signal.

The processor 2h-20 may control all operations of the UE according to an embodiment proposed in the present disclosure. For example, the processor 2h-20 may control a flow of signals between blocks so that the UE performs operations according to the above-described flowcharts.

The memory 2h-30 may store at least one of information transmitted and received via the communication interface 2h-10 and information generated via the processor 2h-20.

Figure 2I:
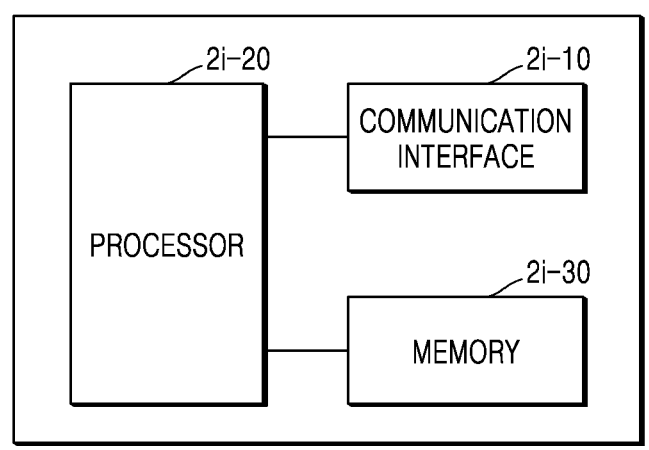
FIG. 2I is a diagram illustrating a structure of a base station according to an embodiment of the present disclosure.

FIG. 2I is a diagram illustrating a structure of a base station according to an embodiment of the present disclosure.

Referring to FIG. 2I, a base station 2i-40 may include a communication interface 2i-10, a processor 2i-20, and a memory 2i-30.

The communication interface 2i-10 may transmit and receive signals to and from other network entities. For example, the communication interface 2i-10 may transmit, to a UE, system information as well as a synchronization signal or a reference signal.

The processor 2i-20 may control all operations of the base station according to an embodiment proposed in the present disclosure. For example, the processor 2i-20 may control a flow of signals between blocks so that the base station performs operations according to the above-described flowcharts.

The memory 2i-30 may store at least one of information transmitted and received via the communication interface 2i-10 and information generated via the processor 2i-20.

A machine-readable storage medium may be provided in the form of a non-transitory storage medium. In this regard, the term 'non-transitory' only means that the storage

The invention claimed is:

1. A method performed by a user equipment (UE), the method comprising:
performing a listen before talk (LBT) on a configured grant (CG) resource in an unlicensed spectrum;
identifying failure of the LBT on the CG resource;
in case that the CG resource overlaps with an uplink (UL) resource on a time axis and the CG resource is configured as a prioritized resource, determining the UL resource as a prioritized resource and the CG resource as a deprioritized resource, based on the failure of the LBT; and
performing UL transmission using the UL resource configured as the prioritized resource.

2. The method of claim 1, wherein performing the UL transmission comprises transmitting a scheduling request (SR) on the UL resource configured as the prioritized resource.

3. The method of claim 2, wherein in case that the CG resource is configured on a first cell and the UL resource is configured on a second cell, the SR is transmitted on the second cell.

4. The method of claim 1, wherein performing the UL transmission comprises:
in case that the CG resource is configured on a first cell and the UL resource is configured on a second cell, cancelling transmission of a medium access control (MAC) service data unit (SDU) and a MAC control element (CE) included in a first MAC protocol data unit (PDU) on the CG resource;
generating a second MAC PDU including the MAC SDU and the MAC CE; and
transmitting the second MAC PDU using the UL resource configured on the second cell.

5. The method of claim 1, wherein performing the UL transmission comprises transmitting a medium access control (MAC) service data unit (SDU) included in a MAC protocol data unit (PDU) for the CG resource to a radio link control (RLC) layer or a packet data convergence protocol (PDCP) layer.

6. The method of claim 1, further comprising:
identifying failure of an LBT for a dynamic grant resource; and
in case that the dynamic grant resource overlaps with the UL resource on the time axis and the dynamic grant resource is configured as a prioritized resource, determining the UL resource as the prioritized resource and the dynamic grant resource as a deprioritized resource, based on the failure of the LBT for the dynamic grant resource.

7. A user equipment (UE), comprising:
a transceiver; and
at least one processor coupled with the transceiver and configured to:
perform a listen before talk (LBT) on a configured grant (CG) resource in an unlicensed spectrum,
identify failure of the LBT on the CG resource,
in case that the CG resource overlaps with an uplink (UL) resource on a time axis and the CG resource is configured as a prioritized resource, determine the UL resource as a prioritized resource and the CG resource as a deprioritized resource, based on the failure of the LBT, and
perform a UL transmission using the UL resource configured as the prioritized resource.

8. The UE of claim 7, wherein the at least one processor is further configured to transmit a scheduling request (SR) on the UL resource configured as the prioritized resource.

9. The UE of claim 8, wherein in case that the CG resource is configured on a first cell and the UL resource is configured on a second cell, the SR is transmitted on the second cell.

10. The UE of claim 7, wherein the at least one processor is further configured to:
in case that the CG resource is configured on a first cell and the UL resource is configured on a second cell, cancel transmission of a medium access control (MAC) service data unit (SDU) and a MAC control element (CE) included in a first MAC protocol data unit (PDU) on the CG resource,
generate a second MAC PDU including the MAC SDU and the MAC CE, and
transmit the second MAC PDU using the UL resource configured on the second cell.

11. The UE of claim 7, wherein the at least one processor is further configured to transmit medium access control (MAC) service data unit (SDU) included in a MAC protocol data unit (PDU) for the CG resource to a radio link control (RLC) layer or a packet data convergence protocol (PDCP) layer.

12. The UE of claim 7, wherein the at least one processor is further configured to:
identify failure of an LBT for a dynamic grant resource, and
in case that the dynamic grant resource overlaps with the UL resource on the time axis and the dynamic grant resource is configured as a prioritized resource, determine the UL resource as the prioritized resource and the dynamic grant resource as a deprioritized resource, based on the failure of the LBT for the dynamic grant resource.

* * * * *